United States Patent
Strohecker et al.

(10) Patent No.: US 6,464,501 B1
(45) Date of Patent: Oct. 15, 2002

(54) SYSTEMS AND METHODS FOR CONSTRUCTIVE-DIALOGIC LEARNING

(75) Inventors: Carol Strohecker; Edith Ackermann; Aseem Agarwala, all of Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/246,962

(22) Filed: Feb. 9, 1999

Related U.S. Application Data

(63) Continuation-in-part of application No. 08/997,249, filed on Dec. 23, 1997, now Pat. No. 6,106,299.

(51) Int. Cl.[7] .......................... G09B 11/00; G09B 19/00
(52) U.S. Cl. ............................ 434/81; 434/96
(58) Field of Search .............................. 434/72, 74–76, 434/79–81, 84, 85, 93, 96–100, 118, 236, 307 R, 333; 345/326, 339, 418, 433, 453, 964; 463/1–47

(56) References Cited

U.S. PATENT DOCUMENTS 5,500,926 A * 3/1996 Matsuo et al. .............. 345/433

OTHER PUBLICATIONS

M. M. Bakhtin; "Introduction"; *The Dialogic Imagination: Four Essays*; University of Texas Press, Austin, 1981; pp. xv–xxxiii.

G.Fischer and K. Nakakoji; "Beyond the Macho Approach of Artificial Intelligence: Empower Human Designers—Do Not Replace Them"; *Knowledge–Based Systems*; vol. 5 No. 1, Mar. 1992; pp. 15–30.

(List continued on next page.)

*Primary Examiner*—John Edmund Rovnak
(74) *Attorney, Agent, or Firm*—Dirk Brinkman; Andrew J. Curtin

(57) ABSTRACT

The present invention relates to a new and useful learning system. A computer-based system permits a user to create and manipulate basic elements within an environment. The system then represents relationships within the environment. The system and user cooperate to provide a learning opportunity for the user. As the user makes or reviews changes of basic elements, he or she can learn how different aspects of an element affect the overall interactions. Two specific embodiments are disclosed. In a first embodiment, the system is used for exploring geometric patterns. The basic elements are tiles which are formed and manipulated through operations of geometric symmetry. The tiles can be combined into different repeating patterns. Multiple tiles can be used within a pattern. Also, new tiles can be created from portions of the pattern. Thus through simple interactions using basic operations and simple parts, complex effects emerge. In other embodiments, the system is used for exploring sociodynamics. The basic elements are creatures with sets of defined behaviors. The system determines interactions between creatures or groups of creatures based upon a complete set of behaviors within the group. The user and the system can manipulate the behaviors, creatures, and interactions. Again, through simple interactions using basic operations and simple parts, complex effects emerge. Finally, a user interface is disclosed which can be used with the system of the present invention. The interface includes display areas for creation of basic elements, interactions between basic elements, and selectable elements or components of elements. The interface also includes a set of selectable functions for operating on specific basic elements or upon the interactions within the environment.

55 Claims, 21 Drawing Sheets

OTHER PUBLICATIONS

Seymour Papert; "Situating Constructionism"; Constructionism: Research Reports and Essays, 1985–1990, Edited by Itit Harel and Seymour Papert; Ablex Publishing Corporation, 1991; pp. 1–11.

Seymour Papert; "Introduction: Computers for Children"; Mindstorms: Children, Computers, and Powerful Ideas, $2^{nd}$ Edition; BasicBooks, 1993; pp. 3–19.

Seymour Papert; "Chapter 2, Mathophobia: The Fear of Learning"; Mindstorms: Children, Computers, and Powerful Ideas, $2^{nd}$ Edition; BasicBooks, 1993; pp. 38–54.

Seymour Papert; "Chapter 6, Powerful Ideas in Mind–Size Bites"; Mindstorms: Children, Computers, and Powerful Ideas, $2^{nd}$ Edition; BasicBooks, 1993; pp. 135–155.

D. A. Schön; "Designing as Reflective Conversation with the Materials of a Design Situation"; Knowledge–Based Systems; vol. 5 No. 1, Mar. 1992; pp. 3–14.

Carol Strohecker; "Understanding Topological Relationships Through Comparisons of Similar Knots"; AI&Society (1996) 10:58–69.

Carol Strohecker; "The Zircus Concept Sketch for a Learning Environment and Online Community"; *Presence*, vol. 6, No. 3, Jun. 1997; pp. 339–349.

Sherry Turkle and Seymour Papert; "Epistemological Pluralism and the Revaluation of the Concrete"; *Journal of Mathematical Behavior*; vol. 11, No.1, 1992.

James V. Wertsch; "Chapter 3, Beyond Vygotsky: Bakhtin's Contribution"; Voices of the Mind: A Sociocultural Approach to Mediated Action; Harvard University Press, Cambridge, MA, 1991; pp. 46–66.

* cited by examiner

SYSTEMS AND METHODS FOR CONSTRUCTIVE-DIALOGIC LEARNING

CROSS REFERENCE TO RELATED APPLICATION

This application is a continuation-in-part of application Ser. No. 08/997,249 filed Dec. 23, 1997 now U.S. Pat. No. 6,106,299.

FIELD OF THE INVENTION

The present invention relates to computerized systems and methods for exploration of and learning about effects that emerge from interrelations between basic elements of complex systems. More particularly, the invention relates to systems and methods which generate representations of interactions between elements created, selected, and transformed by a user for purposes of learning.

BACKGROUND OF THE INVENTION

Computers have provided opportunities for significant advances in educational processes. They have been increasingly used in teaching, particularly for young children who have become extremely adept at using computers. Much educational software is based upon a teacher or tutor model, in which the system guides the user in specific areas with predefined objectives and information to be learned. Such systems interpret different levels of achievement and assume that if the information given is below the user's level, the user may become bored; if the information is above the user's level, the user may become frustrated. Also, under a strict teaching approach, the user has no control over what is being learned. Points of interest to a specific user may be missed. Often instructional software, while presenting important information, is not particularly enjoyable to use; nor is the user's resulting understanding particularly memorable. Therefore, a need exists for learning environments that permit a user to learn material at his or her own pace, exploring to depths of interest, and which are entertaining.

Complex, dynamic systems can be difficult to understand. Such systems do not operate according to a single set of rules that can be easily learned. Instead, they operate as dynamic networks of interdependent elements, which vary in unique ways based upon a large variety of factors present at a given point in time. The world is made up of great numbers of such systems, in both biological and physical domains. Examples of such systems are population growth, weather patterns, economic fluctuations, biological evolution, organizational behavior, and traffic patterns. Since it is difficult to describe such complex systems, not many tools are available for exploring and learning about them. Therefore, a need exists for a system which provides opportunities for learning about and understanding how these complex processes operate.

Mathematics, particularly the mathematics of geometry and spatial relationships, provides opportunities for studying complex systems in ways that can be made simple, enjoyable, and understandable. One way for people, particularly children, to develop mathematical and spatial skills is by working with patterns. Thus, educators and parents encourage children to play with toys that use and manipulate patterns, such as tilings, kaleidoscopes, moire patterns, quilts, mosaics, tangrams, and geometric puzzles. The use of such playthings permits a child to learn by increasing his or her spatial skills while engaged in entertaining activities. However, many existing toys minimize control by the user, limit constructive capabilities that are useful for learning, do not allow for lengthy, rigorous explorations, and cannot capture the dynamic aspects of complex systems.

SUMMARY OF THE INVENTION

The deficiencies of prior educational tools are substantially overcome by the computer-based systems and methods of present invention, which represent interrelated dynamics of complex systems. The system uses the advantage of the memory and computational capacity of computers to allow a user to learn about complex systems through constructive exploration and play. The invention may be implemented as a playful learning environment in which people, particularly children, experiment with dynamic systems by constructing and transforming virtual objects through dialogic interaction with a computational device. The user creates or selects basic elements of the system having defined characteristics. In an embodiment involving geometric patterns, the user begins with a simple design. In embodiments involving sociodynamic systems, the user works with physical or behavioral patterns. The system then operates on the basic elements, simulating and making visible the emergent effects of a complex system.

According to one aspect of the invention, the user can manipulate different aspects of the system, including changes in the basic elements or interactions. The user can also create new basic elements from the interactions within the complex environment. Alternatively, the system may impose operations programmatically to illustrate alternate dynamic qualities of the complex system.

According to another aspect of the invention, methods and apparatus are provided for constructive-dialogic learning. A computational system provides elements for constructing objects. The system also provides a user mode having user functions for application to the elements and a system mode having system functions for application to the elements. In response to user selection of one of the elements and the user mode, a user function is applied to the selected element under user control. In response to user selection of one of the elements and the system mode, a system function is applied to the selected element under system control. Thus, operation of the system involves a combination of user control and system control. This combination is dialogic in nature. The user constructs an object from the elements utilizing the user functions and the system functions through user-controlled, constructive, dialogic interaction with the system.

According to a further aspect of the invention, methods and apparatus are provided for learning in a learning environment including a learner tool, a partner tool, objects, and operations. The method of the invention includes selecting a degree of control over the the learner tool, the partner, the objects, and a subset of the operations, wherein the subset of operations is associated with the selected degree of control, selecting a subset of the objects and interacting with the learner tool and the partner tool to manipulate the subset of objects with the subset of operations according to the selected degree of control. The interaction enables a constructive dialogue between a user and the learning environment.

The selected degree of control over the learner tool and the partner tool is within a range of total learner tool control and total partner tool control. The selected degree of control may be shared between the learner tool and the partner tool to promote turn taking between the learner tool and the partner tool while interacting.

In embodiments of the invention, the objects may comprise geometric patterns, such as tiles, or animated figures, such as creatures. Operations may include, for example, creating objects, modifying objects, saving objects in a library, and replicating objects. The learner tool may include a learner interface and the partner tool may include a partner interface. The sizes of the learner interface and the partner interface may be varied according to the selected degree of control. Learner operations may include generating objects having specified characteristics under user control, and partner operations may include causing the generated objects to interact in accordance with the specified characteristics.

DETAILED DESCRIPTION

Figure 1:
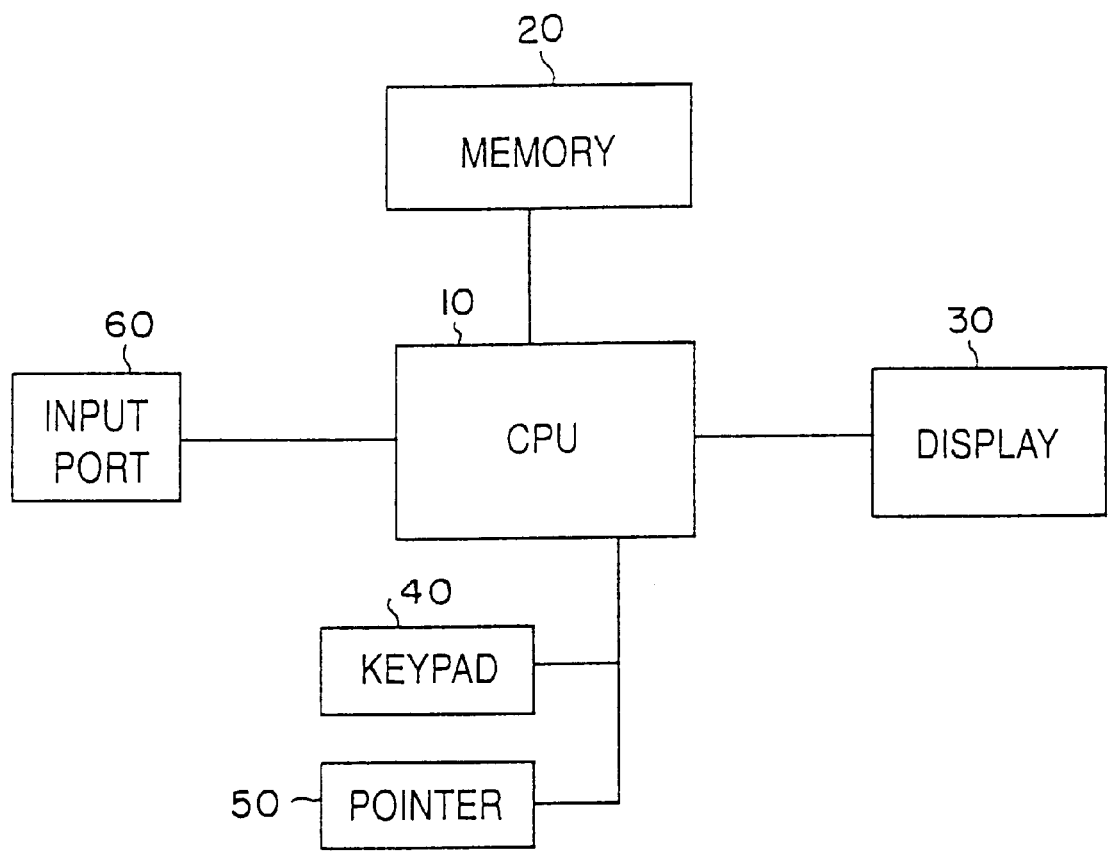
FIG. 1 illustrates hardware for implementing an embodiment of the present invention.

FIG. 1 is a block diagram of an example of a computational system used in implementing the present invention. A central processing unit (CPU) 10 is connected to a memory 20 storing instructions to be executed on the CPU 10. The memory 20 can be any type of memory, including RAM, ROM, CD-ROM, magnetic disk, hard disk, etc. Data generated by the CPU 10 during execution of the instructions is also stored in the memory 20. Alternatively, different memories can be used for the instructions and the data. The CPU 10 is also connected to a display 30 for displaying information to a user. The user can input information through a keypad 40 and pointer device 50. Of course, other types of input devices can be used, such as an ordinary keyboard, a mouse, or a touch sensitive screen. An input/output (I/O) port 60 is also connected to the CPU 10. I/O port 60 can be used to input instructions or data to be stored in the memory 20. Alternatively, instructions or data can be retrieved as needed from devices attached to the input port 60. Thus, since the present invention is designed for interactive learning, different learning modules can be used with the device. The learning modules can include instructions and data stored in a memory which are specific to the type of learning desired. The user connects the learning module to input port 60 to perform the desired types of activities.

Figure 2A:
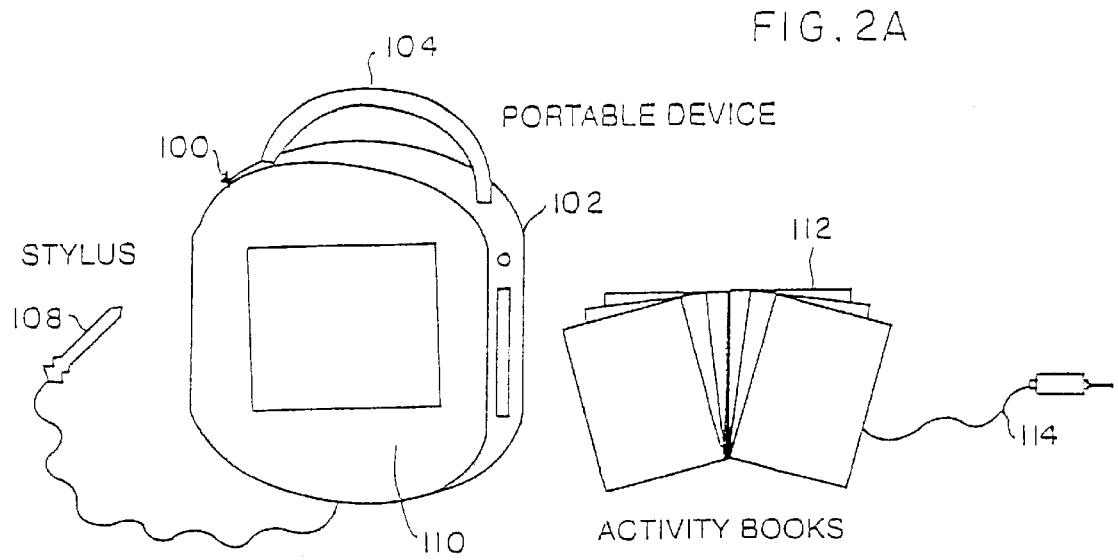
FIGS. 2A and 2B illustrate physical embodiments of the present invention.

The invention may be supported by a specifically designed, self-contained device that a child can carry and which presents its functionality playfully and colorfully. This device may have an attached stylus for inputs from the child and may be augmented by complementary materials in other media (e.g., books, kaleidoscope, etc.) These complementary materials may or may not have I/O capabilities. A portable computational device 100 suitable for implementing the present invention is shown in FIG. 2A. The portable device 100 includes a housing 102 and a carrying handle 104. The size and weight of portable device 100 permit the device to be carried by a child. The housing 102 encloses a CPU, memory and display as shown in FIG. 1 and described above. A stylus 108 connected to the CPU within housing 102 may be used with a touch-sensitive display screen. Alternatively, a pointing device, such as a mouse or a trackball, may be utilized. A display screen 110 functions as a user interface for displaying system operations. The portable device may include an I/O port as shown in FIG. 1 for connection to an external device such as an activity book 112. The activity book may include a touch-sensitive screen, a memory and/or other electronic components. The activity book 112 may be connected to portable device 100 by a cable 114. The activity book 112 may , for example, be used by a child or may provide inputs to portable device 100 for defining elements and functions in accordance with the invention. Any suitable external device may be connected to portable device 100 through the I/O port. Such devices may include electronically adapted versions of books, kaleidoscopes, dolls, and the like.

Figure 2B:
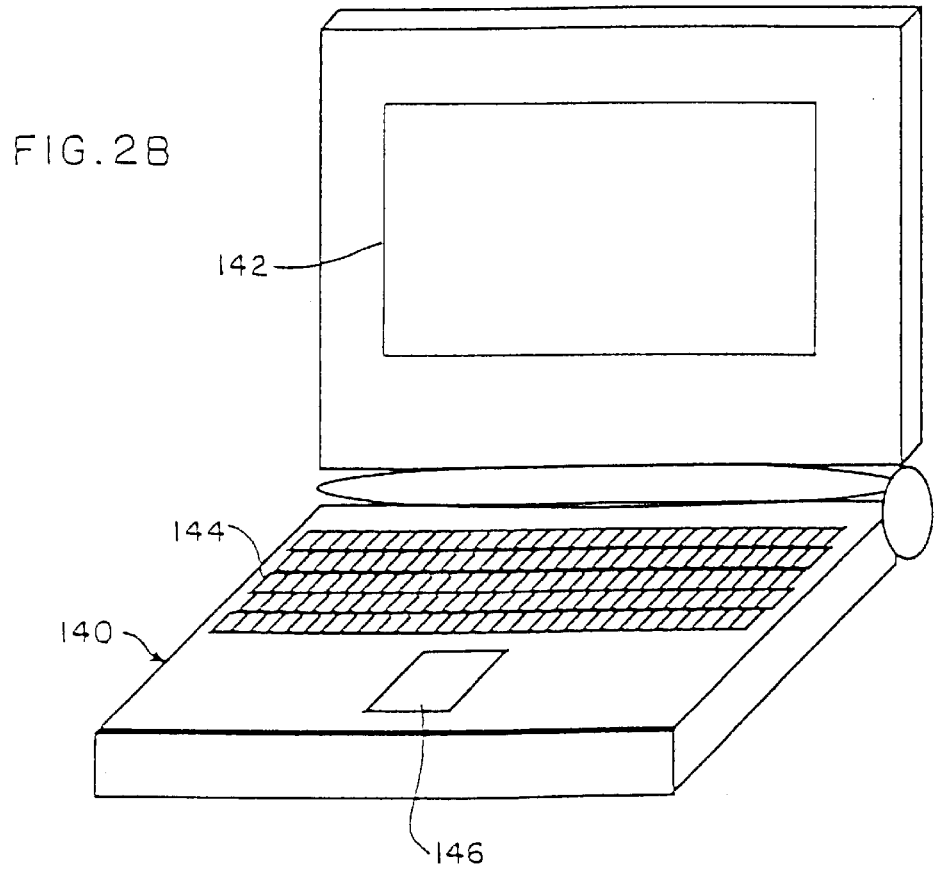

In another embodiment, the invention may be supported by a more traditional implementation on a standard laptop computer, making use of its associated pointing device (mouse, trackball, thumbpad, or etc.). As illustrated in FIG. 2B, a portable computer 140 can be used for implementing the invention. The portable computer 140 includes a CPU, memory and a display 142. A keyboard 144, trackball 146, mouse or other input mechanism can be used to input information from a user. FIG. 2B illustrates a portable general purpose computer. While portability provides additional advantages in ease of use, any type of computer could be used in implementing the invention.

The present invention relates to a system which is used for interactive learning of complex systems. In this system, a user creates objects from basic structural elements according to a selected mode of work by applying various functions and operations to the basic structural elements. Ultimately, a representation results in which the user can perceive effects of interactions between the elements. The system displays the dynamic representation of these interactions. Through a combination of system and user modifications to the basic structural elements and to the resulting interactions, the operation of a complex system can be explored by the user. The invention can be applied to any complex system which includes interactions of basic constituents.

The invention is preferably implemented as a playful learning environment in which children and adults experiment with dynamic systems by constructing and transforming virtual objects through dialogic interaction with a computational device, which may be portable. The environment supports learning through playful exploration. In contrast to the instructional characteristics of most software for learning, the environment fosters a constructive-dialogic style of interaction. The model of the invention is one of experimentation, distributed control, and conversational exchange rather than sequential curriculum and unilateral control. The child shares control with the system through dialog rather than conquest—a dialog that the child initiates. Although the system does not impose a prescriptive sequence of activities or topics, it responds to the child's interventions with specific, consistent, context-sensitive functionality.

The mode of work is as important as the topics in this development. People construct objects, patterns and system states, and then negotiate changes in them. In this way they see how changing one factor influences the entire system. By constructing and transforming objects, people may learn about the domains of social dynamics, geometric symmetry and other complex phenomena. Equally important, people develop intuitions about the common underlying theme of dynamic systems. They also develop an ecological perspective on scientific practice, through sharing control and observing the balance of influences. The system does not impose a prescriptive sequence of activities or topics. Instead, it allows the user to initiate a dialog and responds by generating the unpredictable emerging effects and providing suggestions for further experimentation. Thus the constructive-dialogic nature of the environment provides a unique contribution to existing educational software and educational entertainment.

Figure 3:
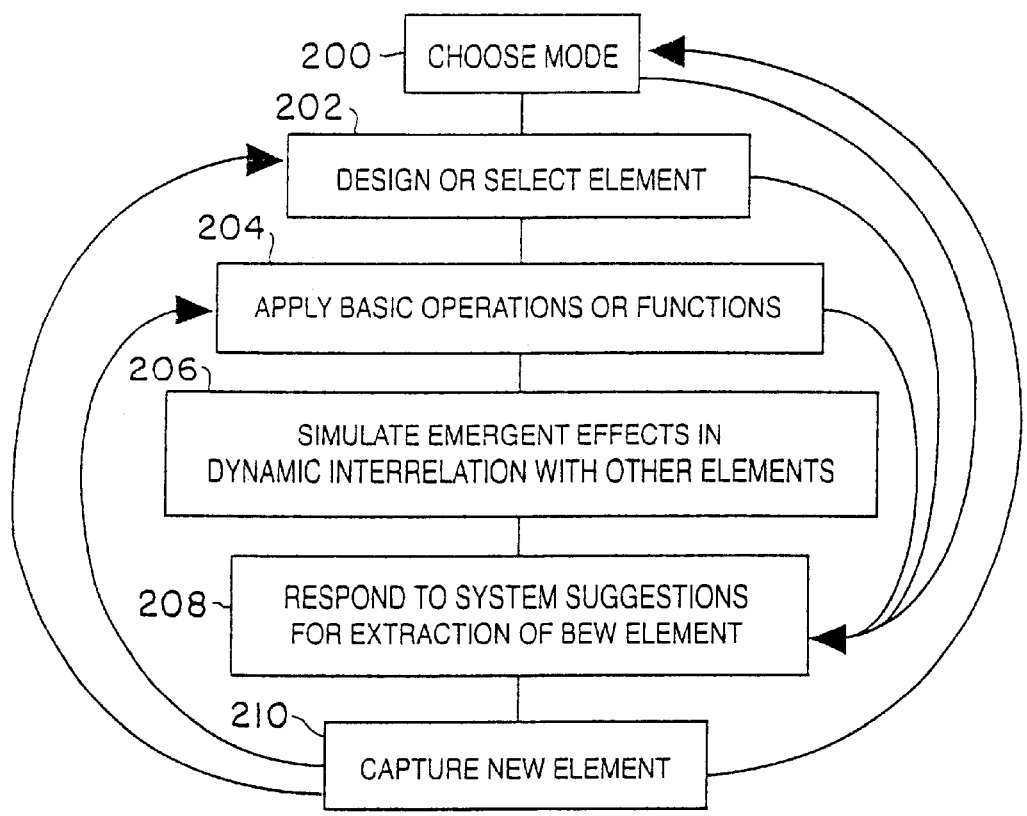
FIG. 3 is a flow diagram of operation of the present invention.
Figure 4A:
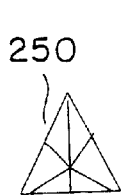
FIGS. 4A–4D illustrate different types of basic elements in a first embodiment of the present invention.
Figure 4B:
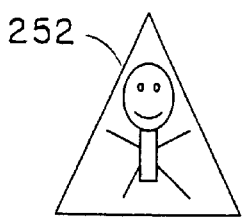
Figure 4C:
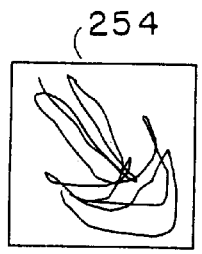
Figure 4D:
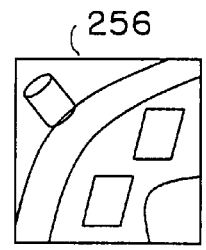
Figure 10:
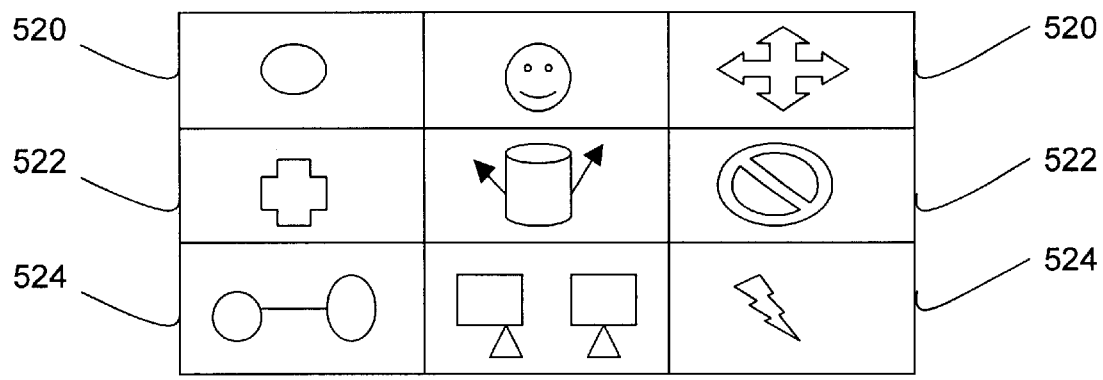
FIG. 10 illustrates basic elements in a second embodiment of the present invention.
Figure 11:
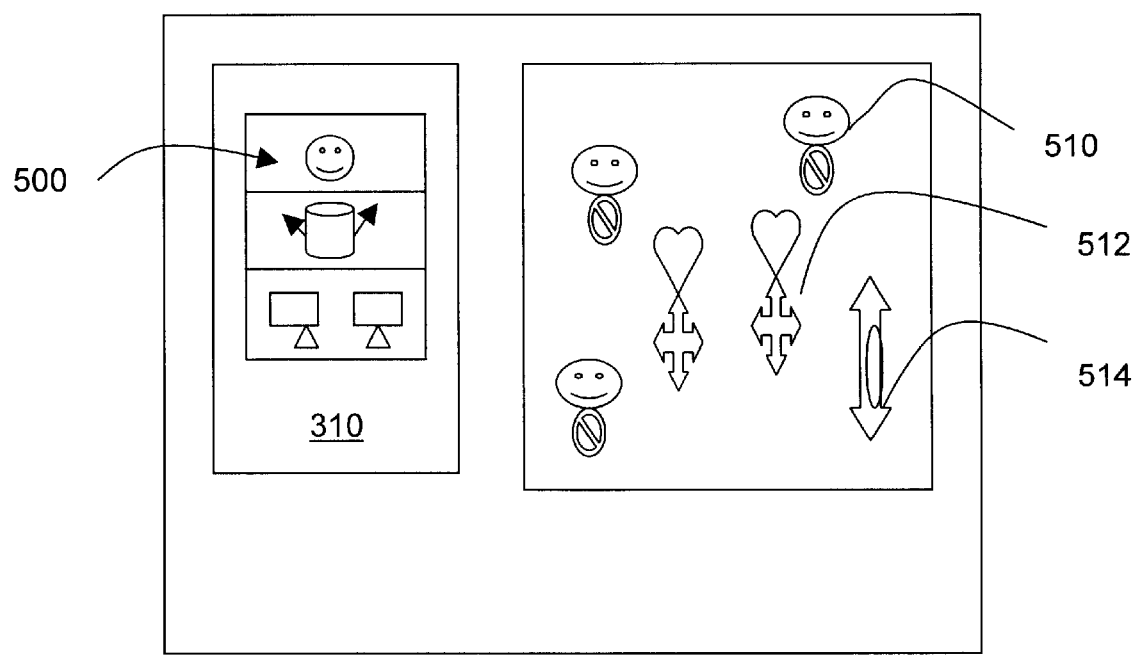
FIG. 11 illustrates compound elements and interactions of elements in the context of functionality of the second embodiment.
Figure 12:
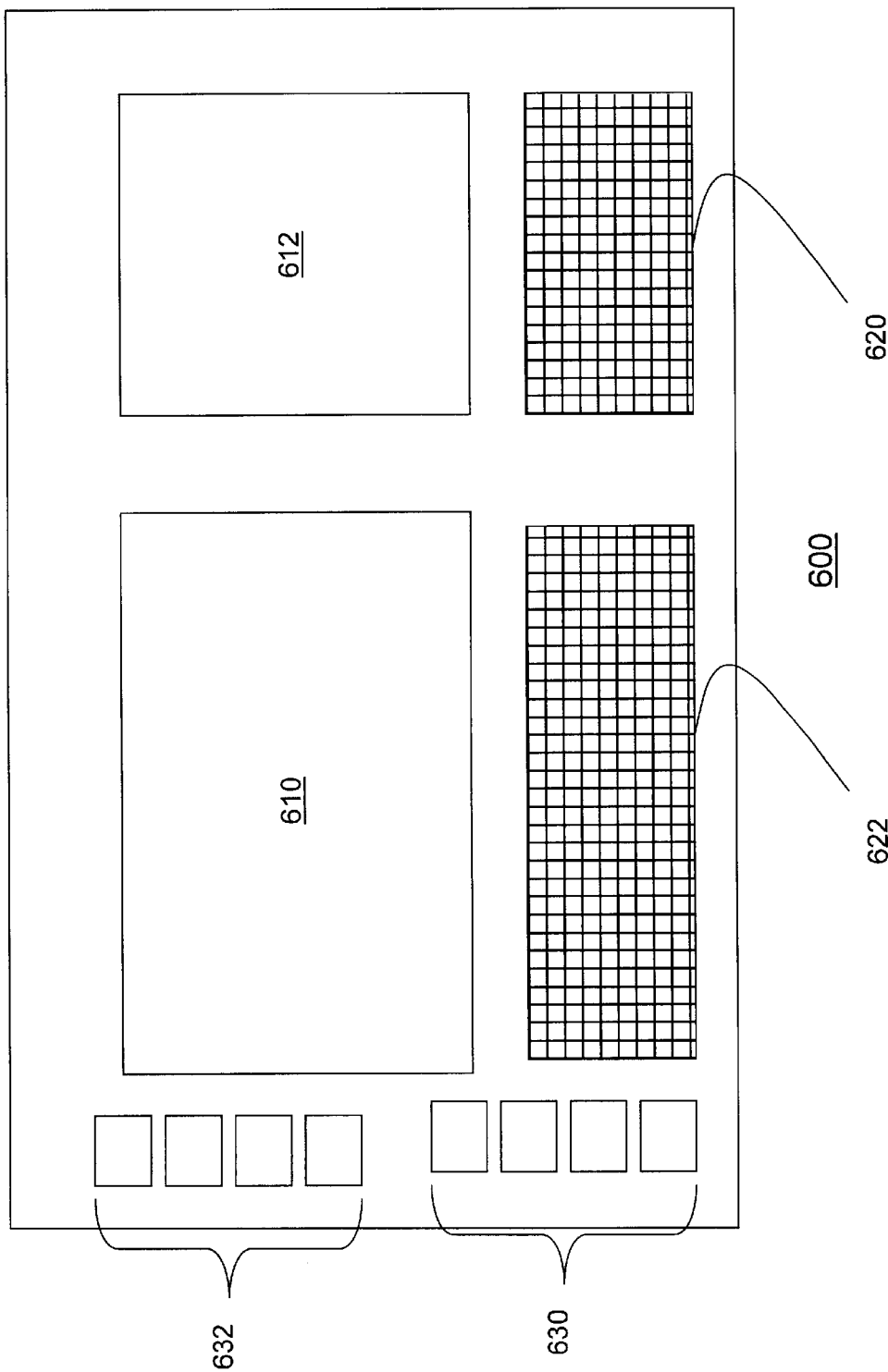
FIG. 12 shows a general display format for visual and functional embodiment of user interactions within applications for exploring interrelated dynamics of complex systems.

FIG. 3 represents the operation of the invention as it applies to complex systems generally. FIGS. 4A–9 illustrate a first specific embodiment of the present invention for exploration of geometric and dynamic properties of colored patterns. FIGS. 10–11 illustrate a second specific embodiment of the present invention for exploration of properties of sociodynamic systems. FIG. 12 represents a general format for visual and functional embodiment. The basic operation of the system is first discussed.

The basic operation of the present invention in interactive learning about complex systems is illustrated in FIG. 3. At step 200, the user selects a mode in which to design a simple or compound element. The element provides the basis for later transformations and modifications. The learning comes from visualizing changes to this element and patterns that result from its interactions with other elements. In step 202, an element may be designed or may be selected from a library of elements. In one embodiment, described below, the user selects a patterned tile from a library of patterned tiles. In step 204, the designed or selected element may be modified by applying basic operations or functions of the system. In the example of patterned tiles, operations such as translate, rotate, zoom, move and replicate may be applied to the basic element. The pointer device is used to select functions and to select and manipulate elements. In step 206, the system may simulate emergent effects in dynamic interrelation with other elements. A variety of functions may be performed by the system, either automatically or interactively with the user. In the embodiment of patterned tiles, the system may replicate the selected element to form a new pattern. In step 208, the user may respond to system suggestions for new elements. In the embodiment of patterned tiles, the system may provide visualized suggestions for new patterns and new tiles. In step 210, the new element may be captured by the user and placed in a library. The user may then proceed to one of steps 200, 202 or 204 to continue operation. It is noted that the user may proceed directly from one of steps 200, 202 and 204 to step 208 to obtain system suggestions for new elements.

In general, the system is under control of the user. However, the user may select system functions which are under preprogrammed control of the system. Thus, the user constructs objects through dialogic interaction with the system. The system may be considered as having a user mode in which the user is under full control of the selection of elements and the selection of functions to be applied to the elements, and a system mode which is selected by the user but which operates in a preprogrammed fashion after selection. The system mode may operate automatically or interactively with the user.

A first embodiment of the invention is described with reference to FIGS. 4A–9. In this embodiment, the system provides a library of tiles having decorative geometric patterns for election by the user and for application of user functions and system functions. Examples of basic tiles 250, 252, 254 and 256 are shown in FIGS. 4A–4D, respectively. Such basic tiles may be modified as described below.

Different functions and operations can be used, such as translate, mirror, rotate, zoom, move, and variably select. The pointer device 50 (FIG. 1) can be used to select and manipulate tiles. A cursor on the display 30 represents the location of the pointer device for selection and manipulation of a tile. Tiles may be combined to form new elements.

Once a compound element has been created, it may then be sized and multiply replicated to form a pattern. In order to explore the effects of pattern changes, different extractions of new elements are possible. A selected portion of the pattern can be captured for further exploration, as the user returns to mode choice, design or selection, and/or application of functions and operations.

The first embodiment also includes an automated process. These transformations are inspired by kaleidoscopes. Multiple changes can be made to all units sequentially or simultaneously. Thus, the patterns can have a changing effect based upon the transformational mode.

Figure 5:
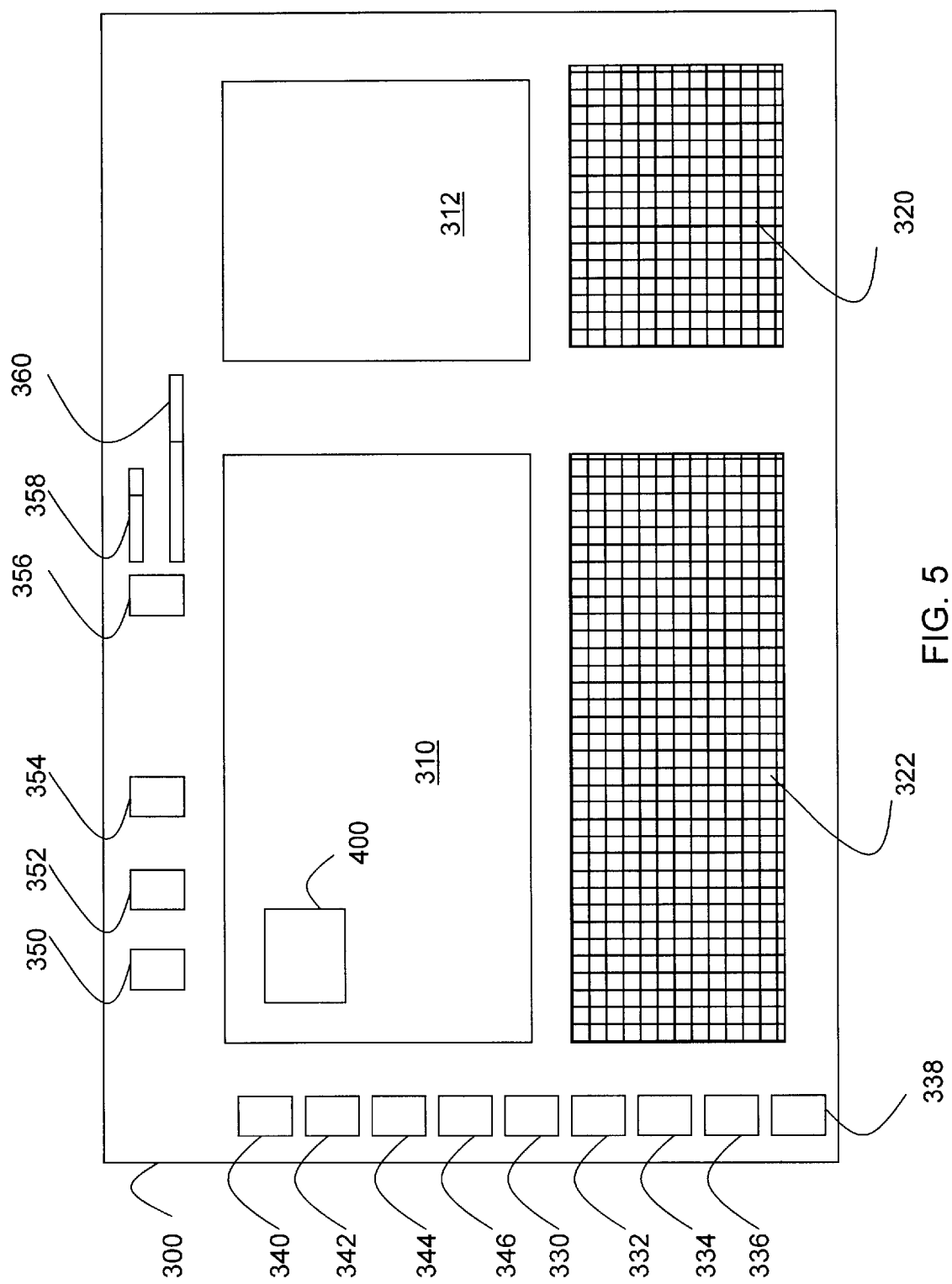
FIG. 5 illustrates basic elements in the context of functionality of the first embodiment.

Working modes, functions, and operations are accessible through visual presentation of the functionalities on a display screen 300, as shown in FIG. 5. Effects of interactions are illustrated primarily through two main display areas of flexible dimension. These areas exist side-by-side and include a user working area 310 and a system working area 312. The user area 310 is for constructing playthings, and the system area 312 is for automatic transformations. The areas change width, as shown in FIGS. 6A–6D, according to whether the interventions of the user or the system are predominant at a given moment. As described below in connection with FIG. 23, a computational system establishes a learning environment in which user area 310 and associated operations constitute a learner tool, system area 312 and associated operations constitute a partner tool, tiles constitute objects, and manipulations of the tiles constitute operations.

Display screen 300 also includes a tile library 320 containing basic tile patterns for election by the user. The user may select one of the tiles in tile library 320 using the cursor and pointing device. Tile library 320 further includes an area 322 for storing user created tiles. The user created tiles may be selected and manipulated at a later time.

A series of working mode buttons 330, 332, 334, 336 and 338 permit the user to select operating mode. The working modes may include DRAW button 330 in which the child designs a tile; QUILT button 332 in which the child arranges tiles into patterns by hand; TILING button 334 in which the child and the system alternate as the child builds tiles and the system spreads them into patterns and suggests selections for new tiles; SHUFFLE button 336 in which the system introduces variations in a pattern by repeatedly applying operations of geometry symmetry in predetermined sequences; and KALEID button 338 in which the system introduces variations in a pattern by applying transformations of basic tile shapes and patterns. Function buttons 340, 342, 344 and 346 may be selected in the tiling mode as described below. The specific operations in the tiling mode may include FLIP button 340 which reflects the tile around the y axis; DROP button 342 which reflects a tile around the x axis; TURN button 344 in which the tile is rotated in 90° increments; and COLLAPSE button 346 in which tiles built as quadrants stacking left to right and top to bottom can be shrunk to a single quadrant, which is then defined as a new tile.

The display screen 300 may also include general functions buttons such as UNDO 350 in which the system returns to the previous state; DELETE 352 in which an individual unit is removed; CLEAR 354 in which everything is removed from the active area (user or system); and SNAP 356 which includes a box that delineates an area to be defined as a new tile. An on-off function 358 toggles the frame off and on, and a size function 360 adjusts the size of the frame.

FIGS. 7A–7D illustrate one mode of creation of compound tiles from basic tiles according to the first embodiment. The construction occurs within the user working area 310 and builds as a four-tile grid. The user may apply functions and operations to modify and transform each of the component basic tiles.

Figure 7A:
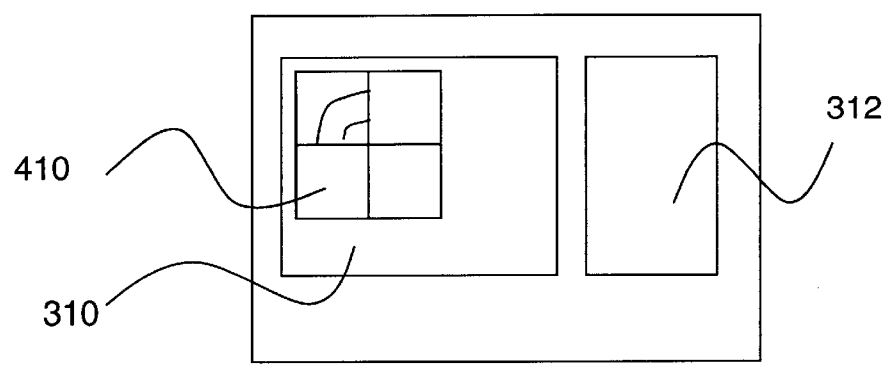
FIGS. 7A–7D illustrate creation of compound elements from basic elements according to the first embodiment.
Figure 7B:
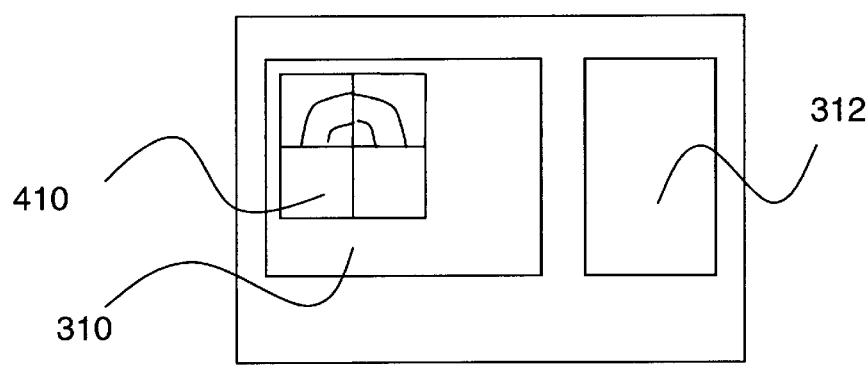
Figure 7C:
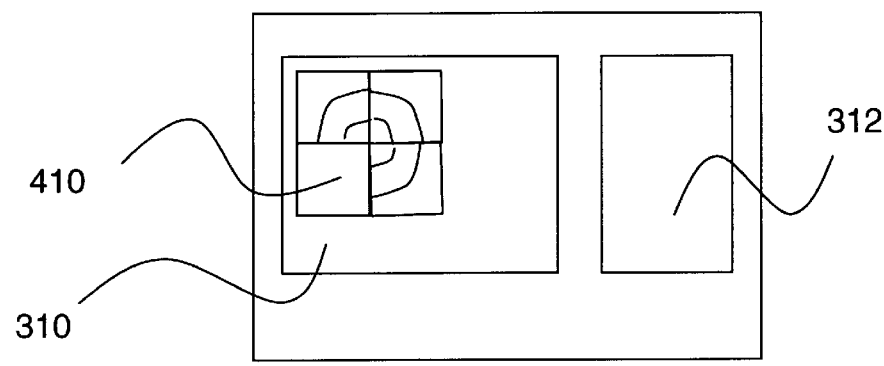
Figure 7D:
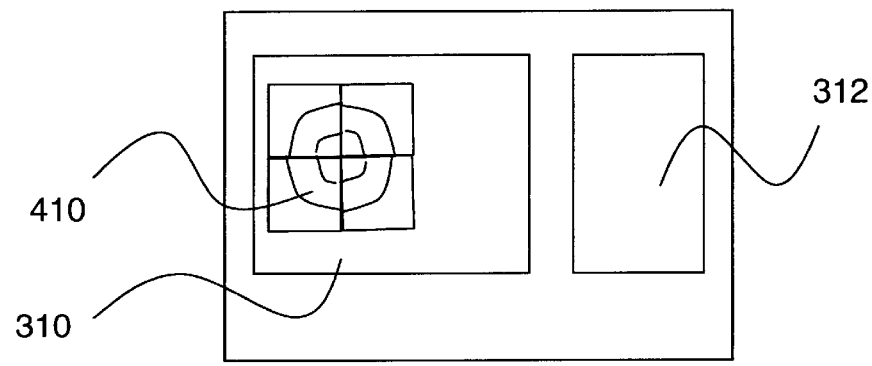

In the tiling mode, exchanges between the user working area 310 and the system working area 312 occur most frequently, exemplifying the constructive-dialogic style of interaction of the present invention. This dialog is performed through the layouts of FIGS. 6B and 6C. The user is greeted with an invitation to construct a tile, indicated by box 400 in FIG. 5. The child drags one of the ready-made tiles from the library 320 and uses it as an element in a new construction, as shown in FIG. 7A. An outline of a four tile grid 410 is then displayed as shown in FIG. 7A. The child may then drag other tiles from the library 320 into the working area 310 as shown FIGS. 7B–7D. The system places each new tile within grid 410. Additional tiles are placed left to right and top to bottom. Each newly placed tile can be transformed by applying operations of geometric symmetry. The flip function reflects the tile around the y axis. The drop function reflects the tile around the x axis. The turn function is a 90° rotation to the right. When the grid 410 is filled, the child can click on the system area 312 to continue the dialog. The system interprets the contents of the grid 410 as a new tile. It then sizes and replicates the tile, arranging it into a pattern in the system working area 312.

Figure 8A:
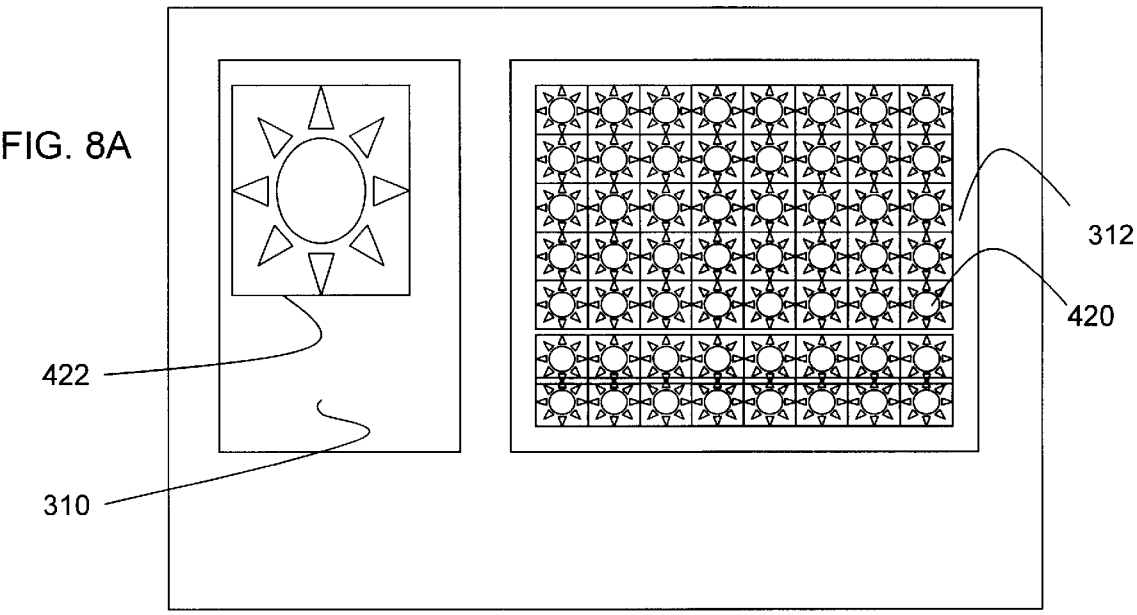
FIGS. 8A and 8B illustrate creation of patterns and emergent effects within the first embodiment.
Figure 8B:
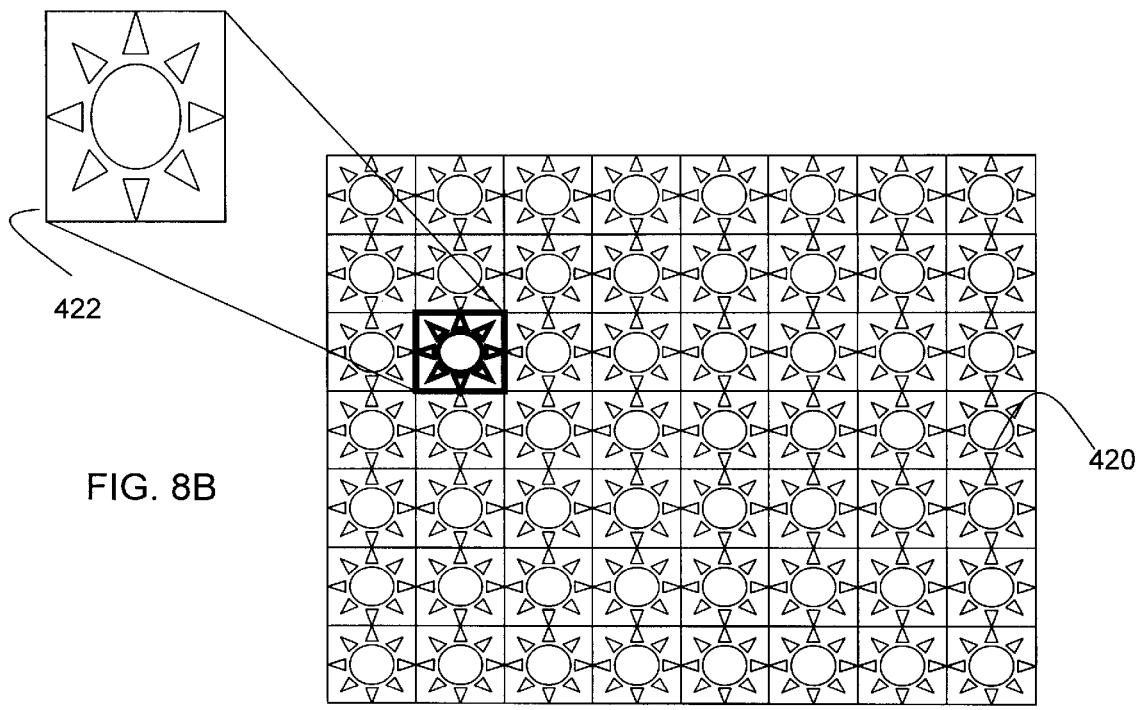

When the system working area 312 is active, the system can complete a proposal made by the user or metaphorically offer suggestions for further interactions on the part of the user. The system may respond to the user construction of a compound element by creating a pattern 420 based on resized and reiterated copies of compound element 422, as shown in FIGS. 8A and 8B.

Figure 9A:
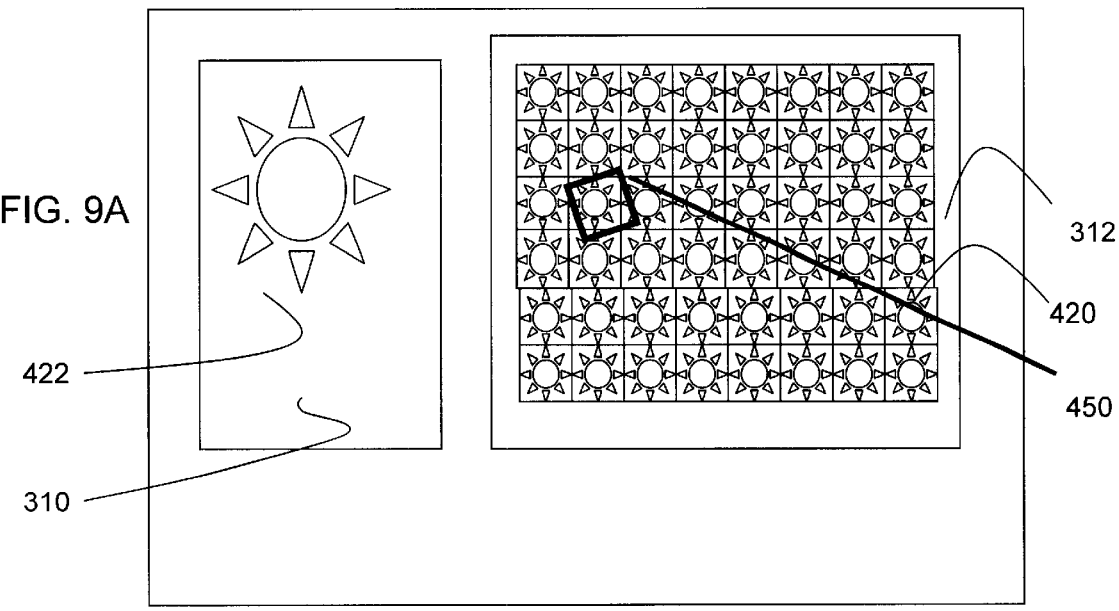
FIGS. 9A and 9B illustrate a suggestion from the first embodiment of a new basic element, and the child's response to accept the suggestion by extracting the new element.
Figure 9B:
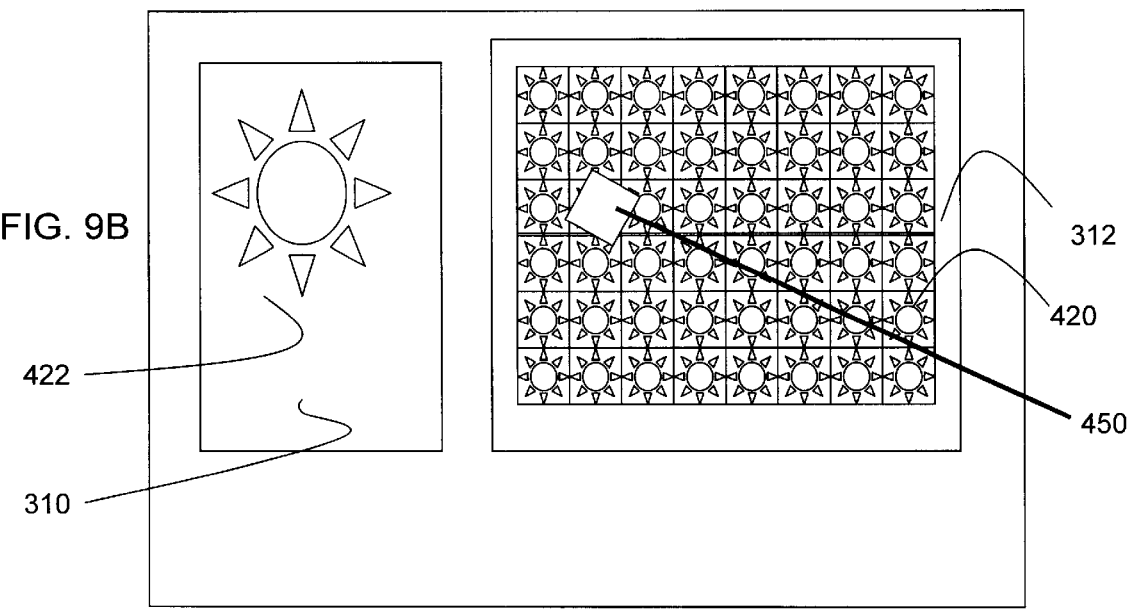

The system then presents an automatically moving frame box 450 that proposes delineations of a pattern for possible exception as a new basic element, as shown in FIGS. 9A and 9B. The moving frame box 450 floats randomly around the pattern. It moves slowly and changes orientation as it goes. The child can stop the movement by clicking directly on the moving frame box 450, freezing its orientation. The frame box 450 can then be repositioned using the pointing device. The child can adjust the size of the frame box 450 or use the on-off function to turn the frame box off, making it disappear. If the child turns the frame box back on, it reappears and resumes its free-floating movement. The child can also cause the frame to resume movement without toggling the frame off and on. Alternatively, the child can double-click the frame or click in the user working area 310 and then in the system working area 312. As this area becomes activated, the frame is again set into motion. When the frame box satisfactorily delineates a new area of the pattern, the child can click on the SNAP button. The system interprets a new tile by grabbing the framed part of the pattern, rotating it back to 020 and saving it to the child's area 322 of the tile library. Now the child can click on the user working area 310. The screen areas adjust size accordingly, and the child can begin a new dialog. With this dialogic style of interaction, the child can create many intriguing patterns.

Figure 6A:
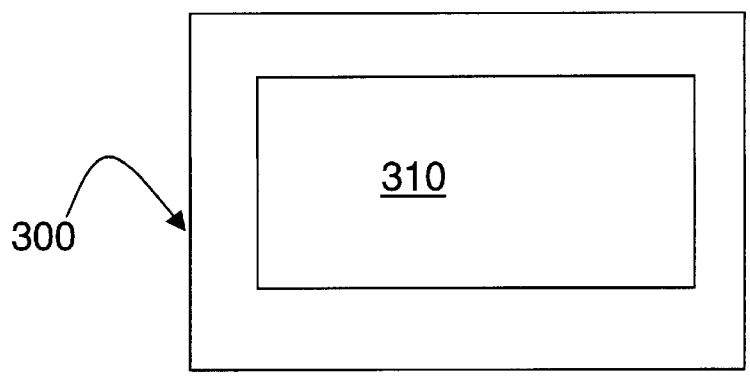
FIGS. 6A–6D illustrate visualization of the constructive-dialogic style of interaction as it is displayed within the first and second embodiments.
Figure 6B:
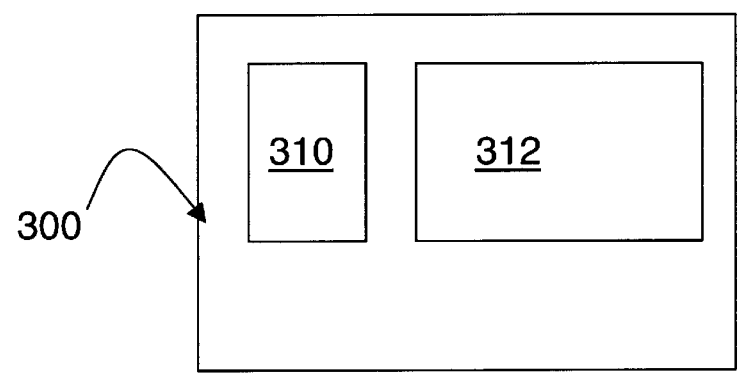
Figure 6C:
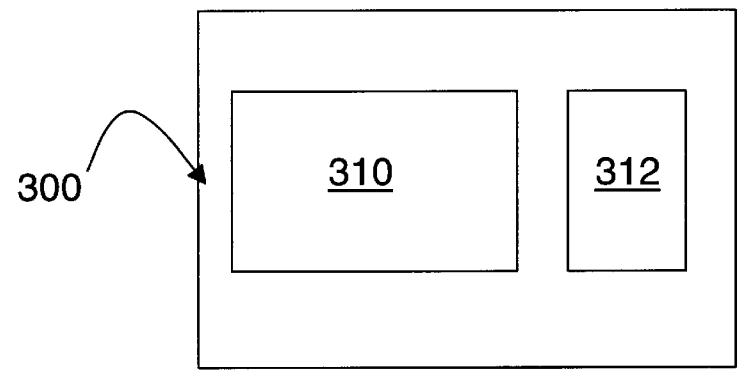

In addition to the tiling mode described above, the system may include manual modes which maximize the child's constructive capability. The user working area 310 is expanded to its maximum width as shown in FIG. 6A and the child's creations result solely from direct manipulation. Thus, the conversational style is more monologic and the child has maximal control. In the draw mode, the child uses a simple palette of tools to create free-hand decorations for the tiles. Newly made tiles may be saved to the child's area 322 of the tile library. In the quilt mode, tiles dragged from the library become patches in a freeform quilt. The child can use the frame to bound new areas across patches. These unique selections may be saved as new tiles in the child's area of the tile library and are available for use in other modes.

Figure 6D:
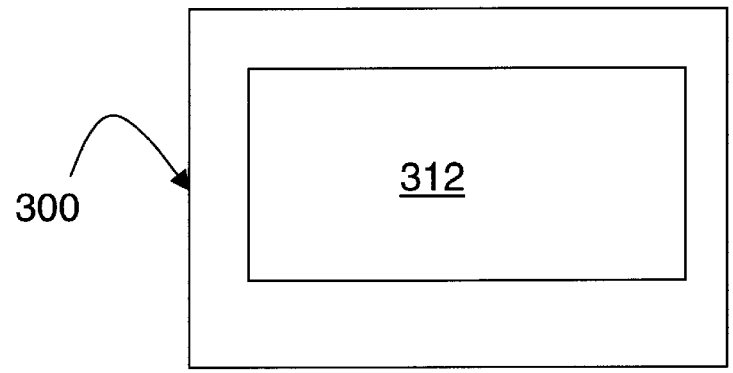

The system also includes automatic modes which maximize the system's contribution. The system working area 312 expands to its maximum width as shown in FIG. 6D, and the system automatically generates variations of geometric patterns. The child relinquishes control temporarily but has an opportunity to contemplate the evolving transformations. In the shuffle mode, the system cycles through a series of transformations, applied repeatedly to generate a dynamic pattern. Varying sequences of the simple operations of geometric symmetry, including flip, drop and turn, create intriguing effects that inspire new creations when the child is in more constructive modes. In the kaleid mode, potentials for greater complexity are served by variations of the basic tile shapes and an expanded repertoire of geometric operations. Thus each mode has its own way of generating new tiles. As the child explores transformations and resulting patterns, examples of the results can be preserved by framing a selection within a pattern. This selection is automatically saved in the child's area 322 of the tile library and is available for use in other modes. As the child becomes more familiar with operation, switching from mode to mode to create colorful tiles and patterns augments the constructive-dialogic style of interaction.

FIGS. 10 and 11 illustrate operation of the invention according to a second embodiment for exploration of sociodynamic systems. The general operation remains as illustrated in FIG. 3 and described above. However, a basic element, rather than being a geometric pattern, is a creature part having both an aspect of a whimsical creature's behavior and a representation of the physical component. The basic creature part may be combined with others to create a tripartite creature 500 that functions as the compound element. By introducing many creatures 510, 512, 514, etc. together into the system working area 312, the child can simulate funky patterns of social interactions. The system area 312 shows many creatures in birds-eye view, and as the creatures influence one another's behaviors, complex patterns emerge. The user, in conjunction with the device, can make further transformations by extracting and changing basic and compound elements, applying operations to inhibit, augment, or reverse behaviors. The same process which applies to geometric patterns also applies to sociodynamic patterns, with comparable results.

FIGS. 10 and 11 illustrate the basic elements for the second embodiment using whimsical creatures with anthropomorphic behaviors. The user selects three creature parts, represented as head 520, belly 522 and base 524, for creating a creature. Each of the different selections for creature parts corresponds to different behaviors. The behavioral components from the different body parts also interrelate to provide an overall behavior for the creature. After creating one or more characters, the system represents an interaction between characters. The creatures 510, 512, 514, etc. interact within system working area 312, and affect one another's behaviors. The movements and interactions change as the creatures move around the field. The creatures may interact in dyads, triads, or groups, which affect the types of interactions. As with the geometric embodiment, the user or system may modify different characters, which changes behavioral patterns. Such transformations can include complete changes in behavioral elements, or changes in the "strength" of a behavioral element. As changes are made, the interactions change and are represented as movements of varying speeds, directions, and patterns on the field.

The second embodiment utilizes the constructive-dialogic style of interaction as well as the general functions described above in connection with the first embodiment. General functions may include undo, delete, clear, and snap. The library includes ready-made creatures and an area having empty slots for the child's creations. Modes of operation may include draw, stage, create, shuffle and enact. The child can duplicate creatures and apply basic operations to inhibit, augment, or reverse behaviors. In enact mode, illustrated in FIG. 10 and performed with the layouts of FIGS. 6B and 6C, the user working area provides a three-part display for assembling the head 520, belly 522 and base 524 of the creature. Each section can display several instances of the associated body part. The child clicks until the desired part is visible. In draw mode performed with the layout of FIG. 6A, the child adds colorful masks and costumes. Personalized creatures are saved to the child's area of the library. In mingle mode, also performed with the layout of FIG. 6A, creatures dragged from the library become dancers in frontal view who interact with each other as dyads, triads, and groups. In stage mode, performed with the layout of FIG. 6D, the user can change environmental conditions by adjusting controls that represent each aspect of creature behavior or its inverse. Fog is the inverse environmental equivalent of an individual creature's reach, or perceptual field; vibes are the environmental equivalent of an individual creatures's appeal; and glaze is the environmental equivalent of an individual creature's tempo, which is the speed of its "dance-in-place." Changes to the environmental conditions affect the creatures' interactions, influencing the overall "dance." In stir mode, also performed with the layout of FIG. 6D, the system cycles through a series of automatic transformations to the environmental conditions, again affecting the overall "dance."

The system preferably includes a user interface 600, illustrated in FIG. 12, which is advantageous for operation of the invention. The user interface can be used with either the special computer embodiment of FIG. 2A or the general purpose computer embodiment of FIG. 2B.

Figure 23:
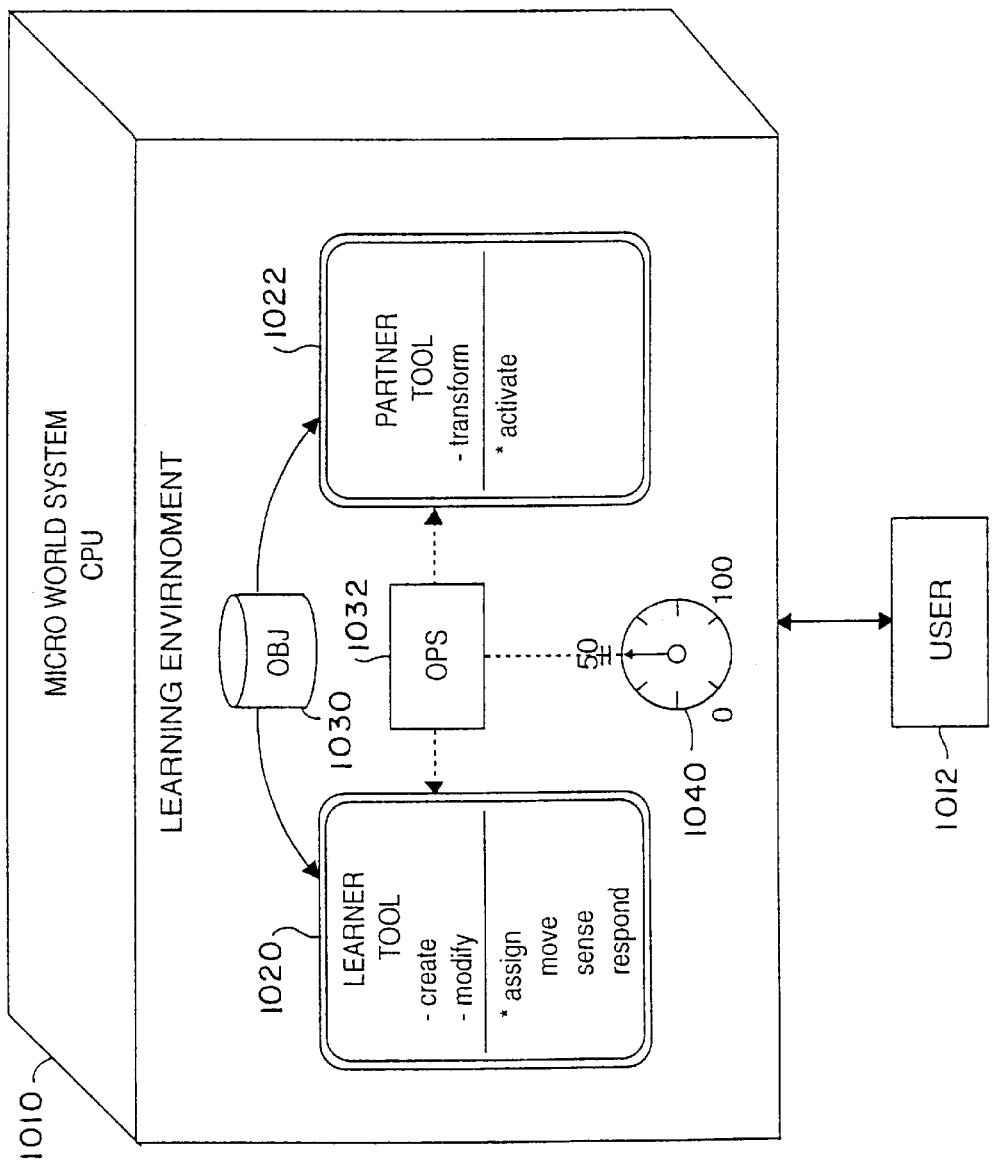
FIG. 23 is a schematic diagram that illustrates generalized features of the present invention.

The user interface includes user working area 610, elsewhere described as a learner tool in conjunction with FIG. 23, and a system working area 612, elsewhere described as a partner tool in conjunction with FIG. 23, which are variable in size as described above. Two sets 620 and 622 of selectable elements are also displayed in an element library. The first set 620 is predefined or generated by the system. The user may select one of these, or combine them. As noted previously, in the special computer embodiment, the first set of elements may be displayed and selected from an external device, rather than or in addition to being displayed in the user interface. The second set 622 are elements generated by the user and saved in the library. For example, in the geometric embodiment, the user may draw new patterns. Also, patterns selected from a repeating pattern using the frame box can be saved in the second set 622 of elements for future exploration. A group of mode buttons 630 is used to select operations on the basic elements or system actions, as described above. Function buttons 632 may be provided for specific manipulations of the elements by the user. The user interface allows the user to control the relative sizes of the displays for basic elements and interactive patterns. Alternatively, the system may automatically adjust the relative size to best accommodate changes caused by actions.

Figure 13:
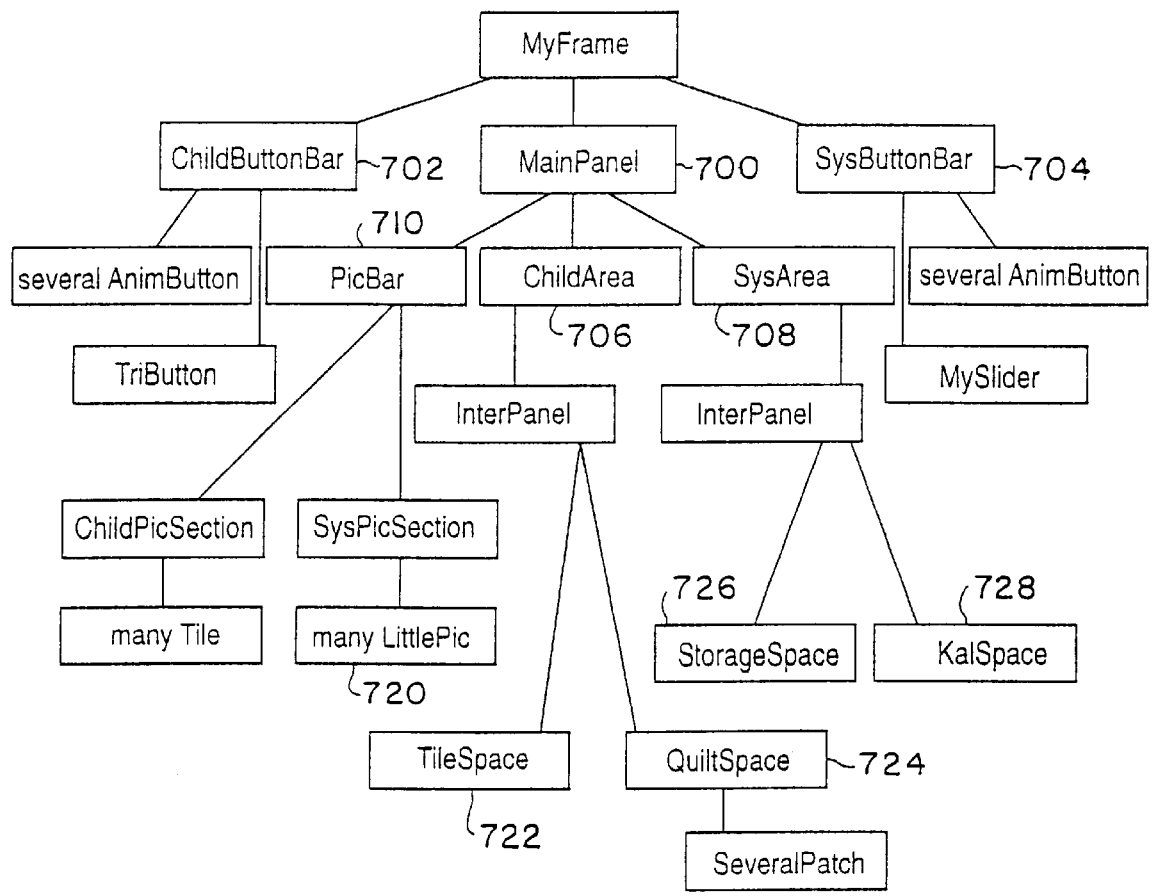
FIG. 13 shows a generalizable object hierarchy for implementing embodiments of the invention as a nested hierarchy of classes and subclasses.

The interface can be implemented as a set of nested objects and subclasses, as shown in FIG. 13. One embodiment of the interface of the invention has been implemented using Java to incorporate elements of its API interface, such as "Panel" and "Canvas" classes. Panel subclasses include MainPanel 700, ChildButtonBar 702, SysButtonBar 704, ChildArea 706, SysArea 708, PicBar 710 and Tile. Canvas subclasses include LittlePic 720, TileSpace 722, QuiltSpace 724, SpreadSpace 726, KaiSpace 728. Drop, Flip, Turn, highlight (invert) and graying out extend Java's Image Filter class. Each element includes information about displays, screen locations, and actions to be executed with selection of locations. If an element does not include an instruction for a particular location, an event message is passed to a higher class in the hierarchy for action.

A third embodiment of the invention is described with reference to FIGS. 14–22. In the third embodiment, the user creates whimsical creatures with anthropomorphic behaviors and launches them onto an activation field in which the creatures interact and affect one anothers' behaviors. The creatures become like dancers on an ice rink. Their movements and intentions appear to change as they glide from one partner to the next. The user can explore these emerging effects by selecting and saving creatures for further study. The third embodiment is similar to the second embodiment described above.

Emergent behavioral patterns, a dance of sorts, result from the interactions between multiple behavioral attributes under specific conditions. Compound creatures interact with one another only as they enter each others' perceptual fields. Within these zones of alertness, creatures can either attract or repel their neighbors, depending upon the user-assigned degree of "sociability". Additionally, each creature is animated by a specific inner motility, which contributes to its movement and helps to determine which of the other creatures it can influence. When no other creatures are present, a creature's motility manifests as a "dance-in-place." Changes of creatures' coordinate locations emerge as a result of all the previously mentioned interactions.

These interactions may be implemented in a number of ways, including equations of magnetism, the Newtonian principle that every action has an equal and opposite reaction, and so on. In one example, simple geometry is used to calculate changes of coordinate positions as creatures influence one another. The activation field consists of a Cartesian grid in which the behavioral interactions are implemented as follows.

A creature continuously shifts its position according to the user-assigned motility pattern. This "dance-in-place," may consist of swaying or revolving motions. Some creatures may not shift at all, but remain steady, maintaining their orientation as they float through the activation field.

When a creature is launched into the field, the program assigns it a random direction. It continues floating in that direction until it runs into a wall bordering the field. Then the direction changes (the angle of incidence being equal to the angle of reflection), and the creature resumes its unidirectional floating. If a swaying or revolving motility pattern has been set, the creature executes this motion as it floats. When more than one creature is in the activation field, further changes of location result as the creatures interact.

The motility pattern and floating determine where a creature's perceptual cone lies and thus what other creatures it can influence at a given time. For each time beat, a creature checks the area within the depth and angled breadth of its cone, to see if any other creatures are present in that area. Calculation of these coordinate locations is performed according to standard trigonometric functions.

If a creature (creature A) determines that another creature (creature B) lies within A's perceptual cone, A uses its sociability attribute as the basis for changes to the (x,y) values that establish B's location. The user-assigned degree of sociability is expressed as a whole number: attraction ranges from 1 to 4, 5 is neutral, and repulsion ranges from 6 to 10. This scale is mapped to a range centered at 0 (−5 to +5) so that a negative value indicates attraction and a positive value indicates repulsion.

Creature A calculates the difference between its (x,y) values and B's, and multiplies the new set of coordinates by A's sociability value to determine a new vector for B, as expressed by a final set of (x,y) values. In the current implementation these values are then multiplied by 100 to boost the result and effect visible changes of the creature's screen position.

In another approach, creatures may be replicated automatically by the system, such replication being similar to that of the first embodiment. Populations of "clones" emerge in an activation field when the user clicks on the corresponding window. The user can then inject diversity into an initially homogeneous behavioral pattern by creating "mutants," launching them into the field, and observing how the existing pattern of behavioral interactions changes. In an alternate implementation, a fourth embodiment, the homogeneous pattern is maintained in one window while the "injections" occur in another, enabling comparisons of patterns with greater and lesser degrees of diversity and resulting complexity of interactions.

In the third embodiment, the compound element that provides the basis for later transformations and modifications is a tripartite column representing a whimsical creature, or animated figure. Each part embodies a specific range of behaviors and appearances. The head, which may be represented by an inverted cone, embodies the creature's perceptual field. The belly, which may be represented by a circle, embodies the creature's sociability. The base, which may be represented by a star-like diamond, embodies the creature's motility. Each of these behavioral attributes has three user-determined settings. The scope of the perceptual field may be narrow, medium or broad. The sociability can be attractive, neutral or repulsive. The motility can be circular, sweeping or steady.

The third embodiment may be implemented in a computational system as shown in FIGS. 1 and 2 and described above. The computational system implements a learning environment as described below. A user interacts with the learning environment through a user interface including the display and the pointing device. Examples of display screen images at different stages of operation and in different operating modes of the third embodiment are shown in FIGS. 14–21.

Figure 14:
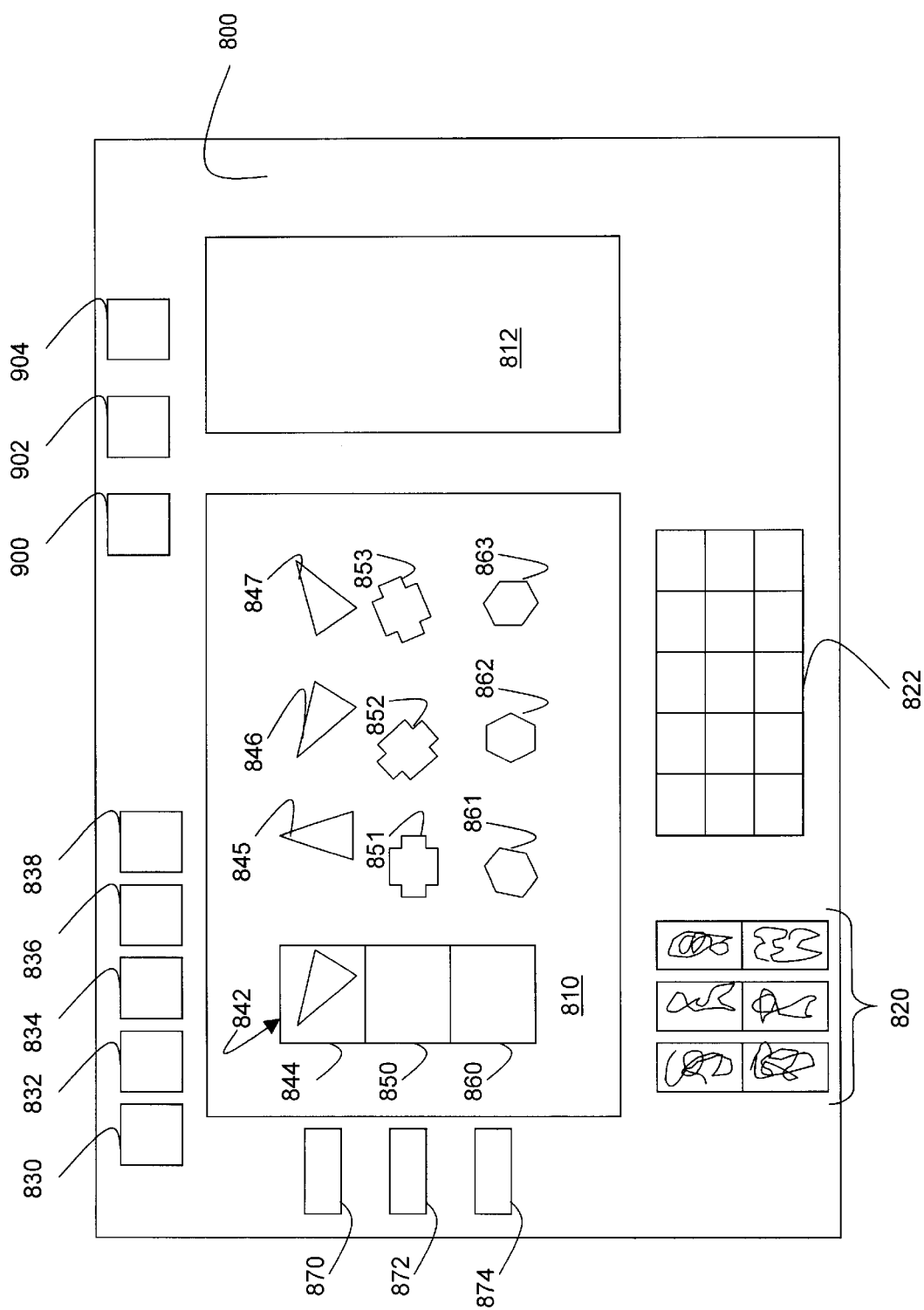
FIGS. 14–16 illustrate the creation of a creature in accordance with a third embodiment of the present invention.

Referring to FIG. 14, a display screen 800 includes a user working area, or user area 810, and a system working area, or activation field 812. The user area 810 is for constructing creatures, and the activation field 812 exhibits the behaviors of the creatures and the interactions between creatures. The areas 810 and 812 change width or disappear entirely according to the selected operating mode. The widths of areas 810 and 812 are indicative of the relative degrees of user control and system control over the functioning of the system.

As described below in connection with FIG. 23, the computational system establishes a learning environment in which user area 810 and associated operations constitute a learner tool, activation field 812 and associated operations constitute a partner tool, creatures constitute objects and manipulations of the creatures and their behaviors constitute operations.

The system also includes a library for saving creature appearances and creature behaviors. Display screen 800 includes a creature appearance library 820 containing creature appearances and a creature behavior library 822 containing user-created creature behaviors. Items in libraries 820 and 822 may be selected and used as described below.

Mode buttons 830, 832, 834, 836 and 838 permit the user to select an operating mode. Different modes provide different functions and provide different degrees of user control and system control over the learning environment. The different operating modes are described below.

Figure 15:
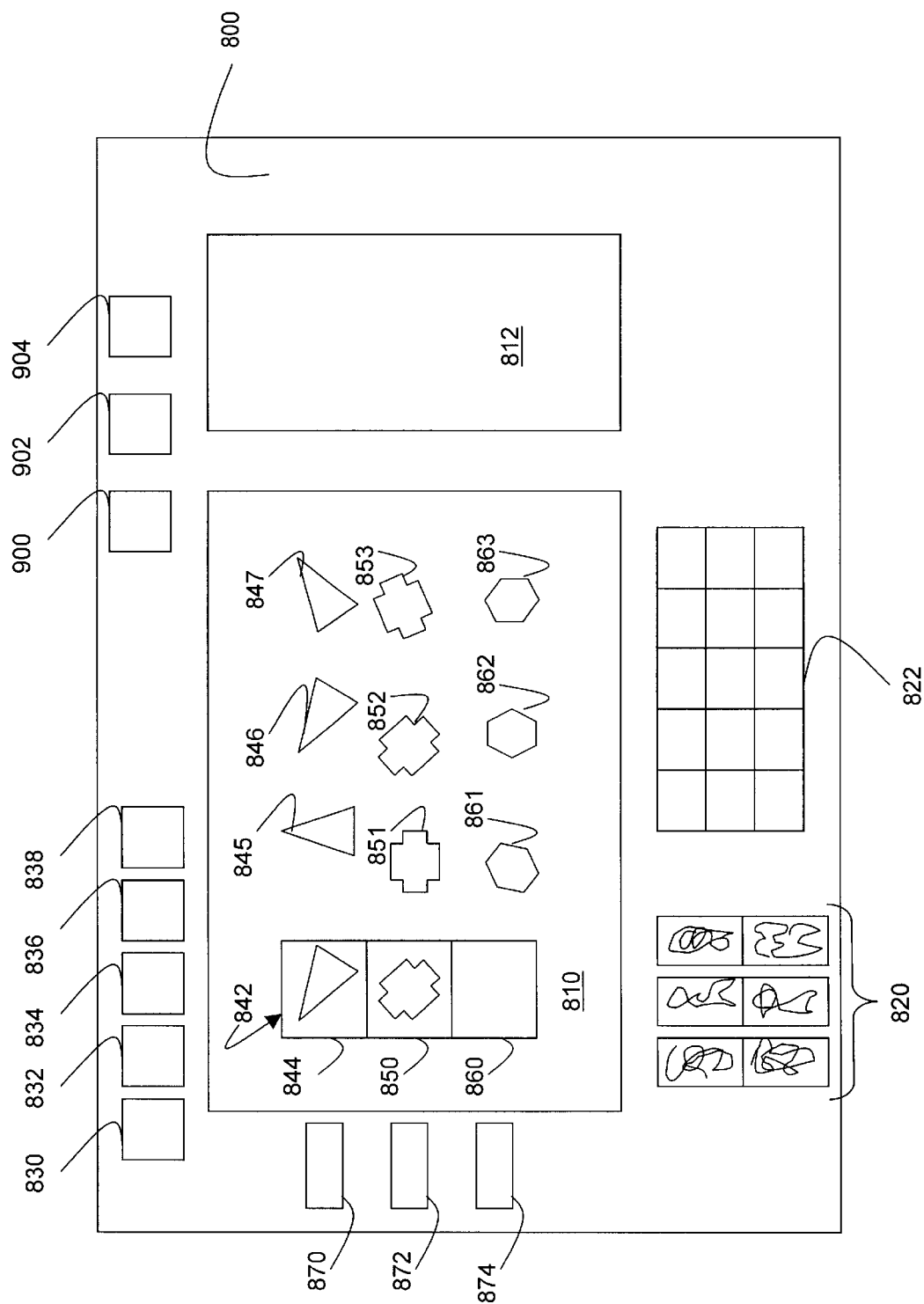
Figure 16:
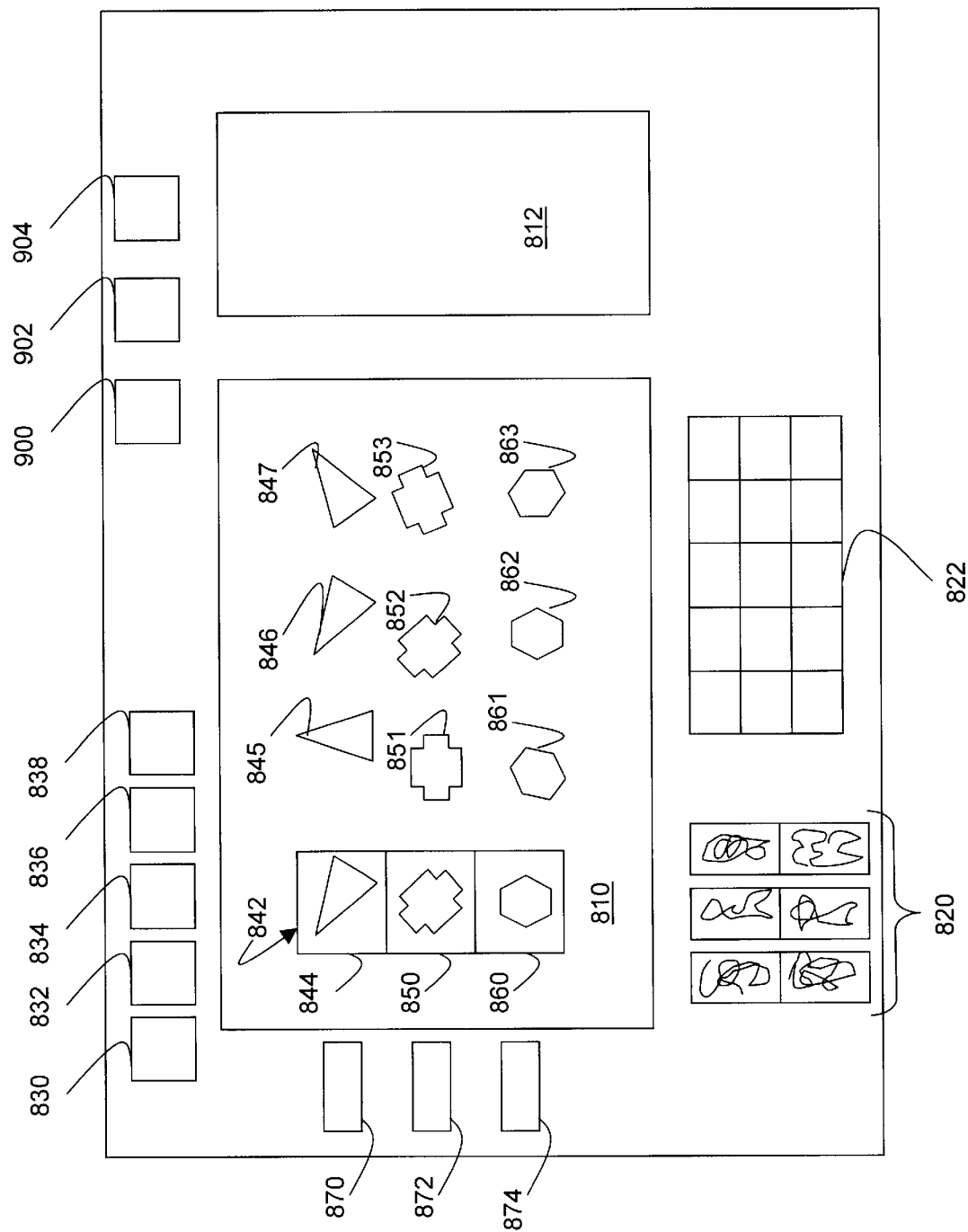

In the enact mode, the user creates creatures and launches them into the activation field 812. As shown in FIG. 14, user area 810 presents the user with a behavioral component library 840, from which behavioral components may be selected by the user to construct a creature. Selected behavioral components are copied to a tripartite column 842 that represents the creature. A head 844 represents the creature's perceptual field and is selected from a narrow perceptual field 845, a medium perceptual field 846 and a wide perceptual field 847 in behavioral component library 840. As shown in FIG. 14, the medium perceptual field 846 was selected by the user. A belly 850 is selected from an attractive sociability 851, a neutral sociability 852 or a repulsive sociability 853 in behavioral component library 840. As shown in FIG. 15, the attractive sociability 851 was selected by the user. The user further selects a base 860 which represents the creature's motility. The base 860 is selected from a circular motility 861, a sweeping motility 862 or a steady motility 863 in behavioral component library 840. The sweeping motility 862 and steady motility 863 move appropriately in the behavioral component library 840 and in the base 860 portion of the tripartite column 842. FIG. 16 shows a moment illustrating the circular motility 861 or the sweeping motility 862 having been selected by the user.

In addition, the user can fine-tune the intensity of each selected behavior by adjusting sliders 870, 872 and 874. REACH slider 870 adjusts the depth of the perceptual field, APPEAL slider 872 adjusts the degree of attraction or repulsion and TEMPO slider 874 adjusts the frequency of the creature's movement in place.

It will be understood that the creature creation process shown in FIGS. 14–16 and described is given by way of example only. The user-created creature may have more or fewer component behaviors. In addition, the behavioral component library 840 may contain more or fewer selections for each component behavior, and different icons may be used to represent component behaviors. Furthermore, the types of behaviors attributed to the creature may vary widely within the scope of the invention.

Figure 17:
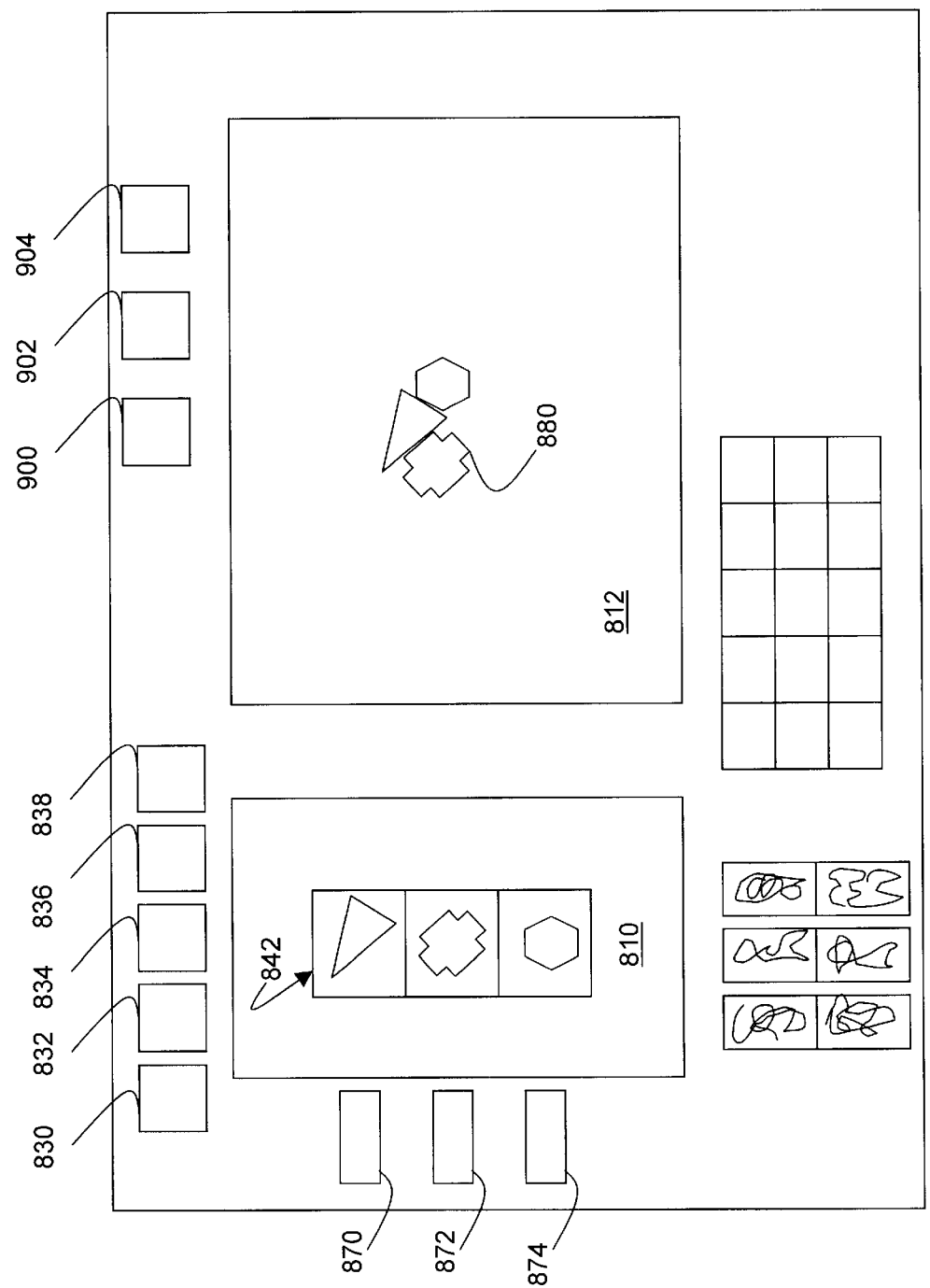
FIG. 17 illustrates the launching of the user-created creature into an activation field in accordance with the third embodiment.

After the user has created a creature in column 842, the user may click on activation field 812, causing user area 810 to be reduced in width and activation field 812 to be increased in width, as shown in FIG. 17. The user-created creature, shown in frontal view as separate components in column 842, is shown in collapsed form as a creature 880 in activation field 812 to simulate a birds-eye view. The creature 880 moves in activation field 812 according to the selected motility and a randomized direction for coordinate position changes.

The user may then click on user area 810. The activation field 812 is narrowed, and the user area 810 is widened as shown in FIGS. 14–16. The user may then create another creature using the process described above in connection with FIGS. 14–16. The second creature can then be launched by clicking on activation field 812, as shown in FIG. 17. Additional creatures may be created and launched in subsequent iterations of this process. By clicking back and forth between user area 810 and activation field 812, the user can cause multiple instances of a user-created creature to be launched into activation field 812. When the user area 810 is active, the user can create a new creature. Each click on the activation field 812 launches into the activation field whatever creature currently appears in user area 810.

Figure 18:
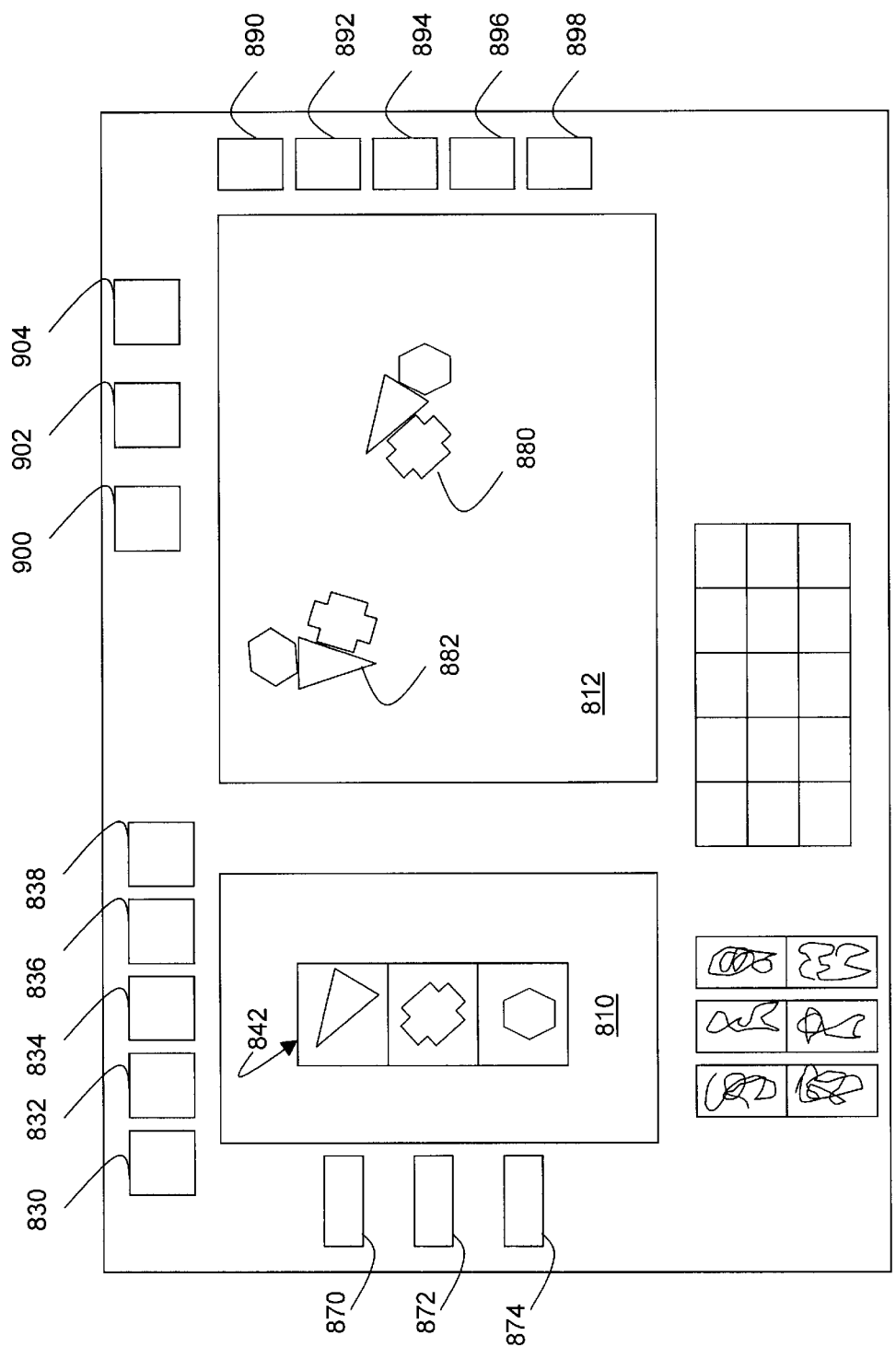
FIG. 18 illustrates an activation field having creatures which interact with each other in accordance with the third embodiment.

As shown in FIG. 18, the user has launched creatures 880 and 882 into activation field 812. The creatures move in activation field 812 according to their selected motilities and randomized directions. When the perception fields of the creatures overlap, the creatures interact in accordance with the selected sociabilities, which cause further changes of coordinate position. Multiple creatures can appear simultaneously in activation field 812. As the creatures move about activation field 812, emerging effects become apparent as the multiple behaviors interact. Pairs and groups of creatures form and disperse as the creatures' behaviors influence one another.

The user can explore the simulated sociodynamic patterns interactively, using the basic operations and functions of the system. The user can click on a creature in activation field 812 to stop its movement. The user can then relocate the creature, duplicate or delete it, or use the sliders 870, 872 and 874 to adjust its behaviors. Clicking again on the creature restarts its movement. Function buttons at the right of activation field 812 include an UNDO button 890 which reverts the system to a previous state, a CLONE button 892 which duplicates a selected creature, a REMOVE button 894 which deletes a selected creature, a CLEAR button 896 which deletes all creatures from activation field 812 and a SNAP button 898 which prints the screen.

Figure 19:
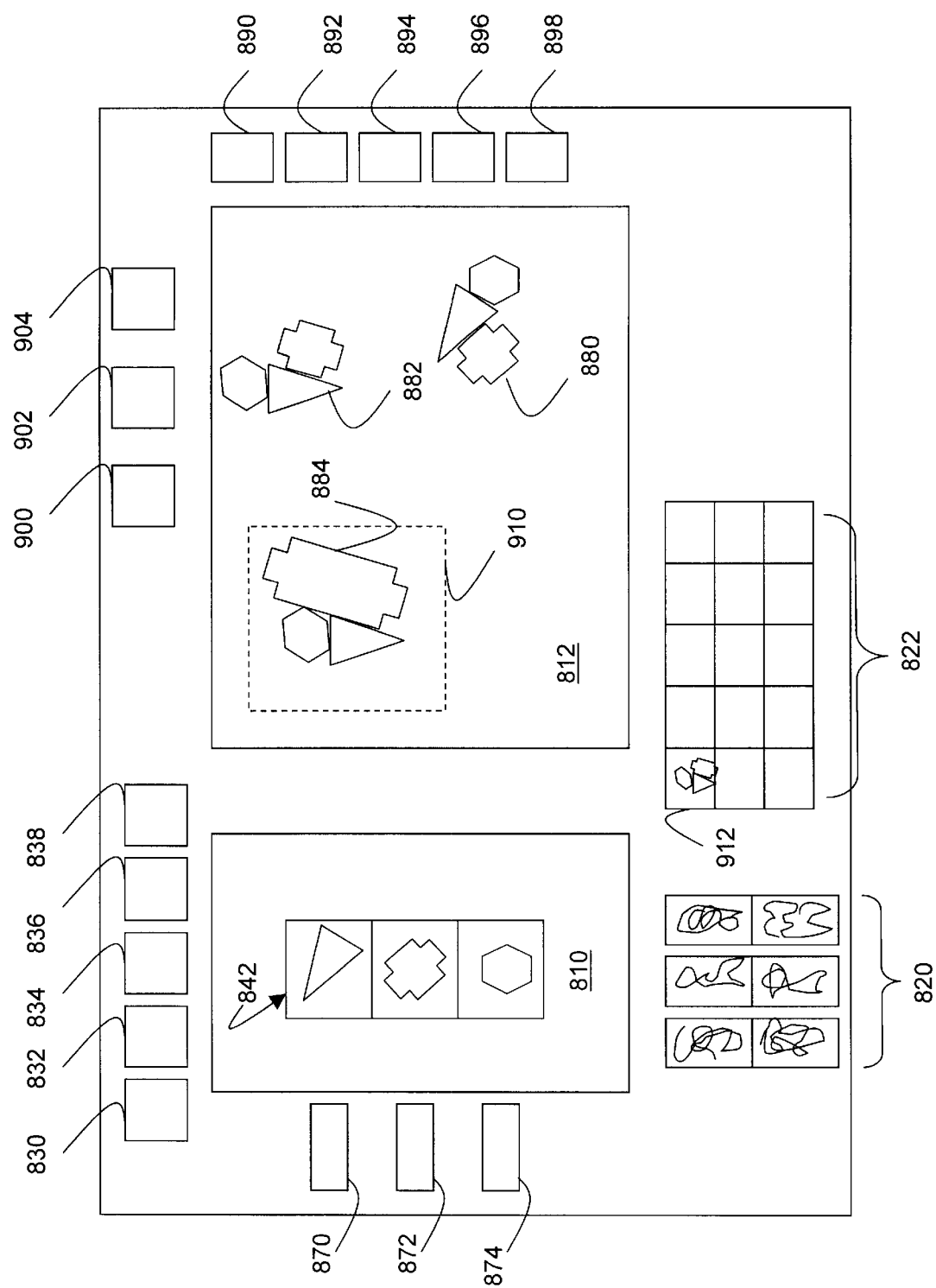
FIG. 19 illustrates an activation field wherein a frame is used to select a creature in the activation field and further illustrates the saving of a user-created creature in a library.

The system may also include a FREEZE button 900, a FRAME button 902 and a FLAG button 904. The FREEZE button 900 stops and restarts the movement of all creatures in activation field 812. The FRAME button 902 displays a colored square 910, as shown in FIG. 19, which can be positioned around a creature so the creature can be saved to the creature behavior library 822. As shown in FIG. 19, creature 882 has been saved in box 912 of creature behavior library 822. If the user clicks on square 910, creature 884 will be saved to creature behavior library 822. The FLAG button 904 places a colored spot on a creature, marking it so that the user can follow the creature in the fray.

As indicated above, the third embodiment has five operating modes which provide different ways of playing with creatures and their behaviors, and varying degrees of user and system control. In draw mode, selected with DRAW button 830, basic draw and paint tools enable the user to design creature appearances. Creature appearances in the draw mode may be saved to a creature appearance library 820 using FRAME button 902.

Figure 20:
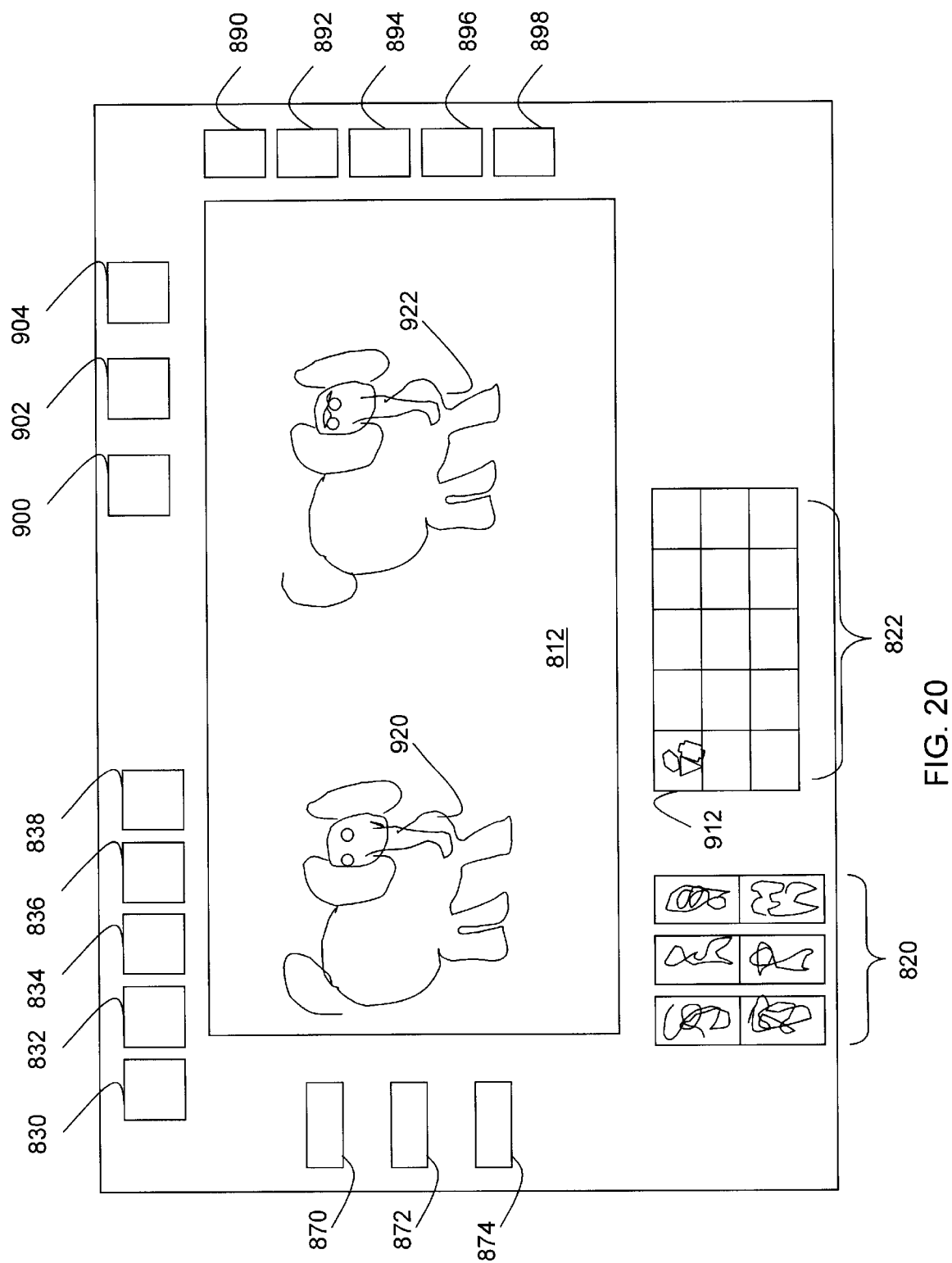
FIG. 20 shows a mingle mode in accordance with the third embodiment, wherein creature appearances and behaviors are combined.

In mingle mode, selected with MINGLE button 832, users can bring appearances and behaviors together as shown in FIG. 20. Activation field 812 is widened to its maximum width, and user area 810 disappears. The creatures appear in frontal view but behave as in the birds-eye view. The head, belly and base components of creatures appearances can be interchanged. When an appearance overlays a behavior, the creature acts consistently with its component behaviors and can move about the activation field 812. The appearances and behaviors are brought together by selecting creature appearances from creature appearance library 820 and creature behaviors from creature behavior library 822; they appear together in activation field 812. The user may also utilize creature appearances from creature appearance library 820 without behaviors. Appearances without behaviors have an interesting presence, but do not move or behave in any way. As shown in FIG. 20, creatures 920 and 922 are shown in frontal view and have appearances that underlie behaviors. REACH slider 870, APPEAL slider 872 and TEMPO slider 874 may be used to adjust the respective aspects of the creatures' behaviors.

The enact mode, selected by ENACT button 834, permits users to create and launch geometric representations of creatures' behaviors as described above in connection with FIGS. 14–19.

Figure 21:
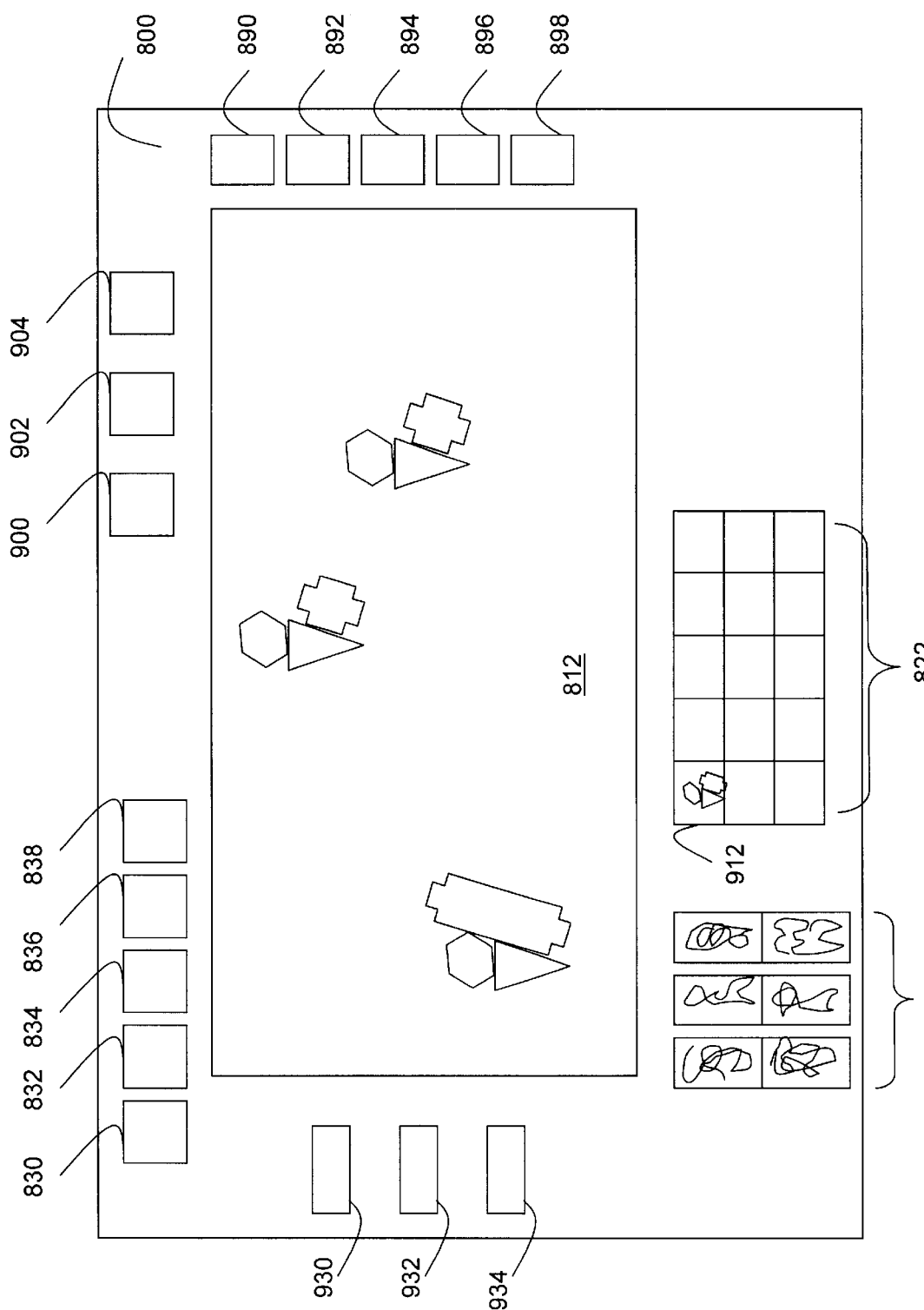
FIG. 21 shows a stage mode in accordance with the third embodiment, wherein behavioral attributes of the creatures in the activation field can be adjusted by the user.

The stage mode is activated by selection of STAGE button 836. As shown in FIG. 21, activation field 812 increases to its maximum width, and the user area disappears. In stage mode, the user can adjust the behavioral attributes of all the creatures in activation field 812 simultaneously using a FOG slider 930, a VIBES slider 932 and a GLAZE slider 934. The sliders 930, 932 and 934 retain their pertinence to the behavioral attributes of the creatures, but operate at the level of the entire activation field 812 rather than on individual creatures. Reach becomes fog; appeal becomes vibes; and tempo becomes glaze. FOG slider 930 darkens and lightens activation field 812, which has the effect of changing the depth of all the creatures' perceptual fields. The VIBES slider 932 sends imaginary charges through the activation field 812, which has the effect of changing the degrees of all the creatures' sociabilities. The GLAZE slider 934 adjusts friction, which has the effect of changing all the creatures' motility.

The stir mode is activated by selection of STIR button 838. The stir mode is similar to the stage mode in that changes affect the entire activation field 812. However, changes occur automatically under system control. In this contemplative mode, the system adjusts environmental conditions as alternating sequences of fog, vibes and glaze effects.

Figure 22:
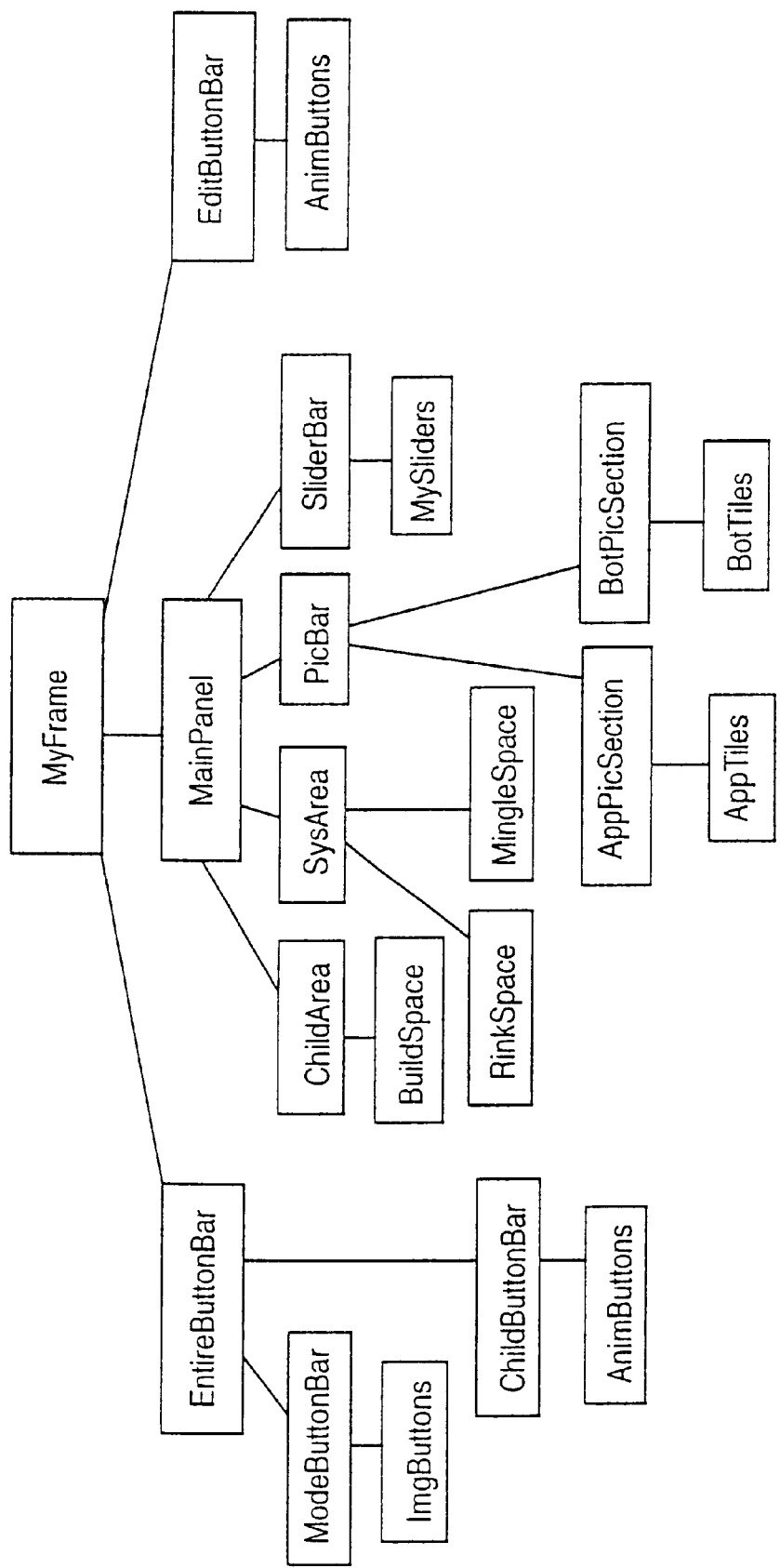
FIG. 22 shows an object hierarchy for implementing the third embodiment of the invention as a nested hierarchy of classes and subclasses.

The third embodiment functions operate at the level of the interface and can be implemented as a set of nested objects and subclasses, as shown in FIG. 22. One embodiment of the interface has been implemented using Java to incorporate elements of its API interface. Each element includes information about displays, screen locations, and actions to be executed with selection of locations. If an element does not include an instruction for a particular location, an event message is passed to a higher class in the hierarchy for action.

A generalized representation of the systems and methods for constructive-dialogic learning in accordance with the invention is shown in FIG. 23. The system of FIG. 23 corresponds to the embodiments described above, as well as to other embodiments of the invention. The programmed computational system may be viewed as implementing a learning environment 1010 which interacts with a user 1012 to establish a constructive dialogue between user 1012 and learning environment 1010. Learning environment includes a learner tool 1020 and a partner tool 1022. Associated with both learner tool 1020 and partner tool 1022 are objects 1030 and operations 1032. Learner tool 1020 performs operations 1032 on objects 1030 under user control. Partner tool 1022 performs operations 1032 on objects 1030 under control of learning environment 1010. Some of the operations 1032 are common to learner tool 1020 and partner tool 1022, while operations may be unique to learner tool 1020 or partner tool 1022.

Learning environment 1010 permits user 1012 to select a degree of control over learner tool 1020, partner tool 1022, objects 1030 and operations 1032. User selection of a degree of control is represented in FIG. 23 by a dial 1040 which ranges from total partner tool control to total learner tool control. Where the learner tool 1020 has total control, operation of learning environment 1010 is entirely controlled by user 1012. Where the partner tool 1022 has total control, operation is automatic under control of learning environment 1010, and user 1012 has little or no control. Of particular importance is a range of control in the vicinity of 50% learner tool control and 50% partner tool control, namely shared control. In this range of selected control, turn-taking occurs between the learner tool under user control and the partner tool under learning environment control, and a constructive dialogue is established between the user and learning environment.

With reference to the first embodiment described above, objects 1030 correspond to tiles and operations 1032 correspond to operations performed on the tiles, such as create, modify, combine, replicate and save. The learner tool 1020 corresponds to user area 310 and the operations performed in user area 310 under user control. Partner tool 1022 corresponds to system area 312 and the operations performed by the computational system in system area 312.

The selectable degrees of learner tool control and partner tool control correspond to the different modes which may be selected by the user. In the draw mode and the quilt mode, the learner tool under user control dominates. In the shuffle mode and the kaleid mode, the partner tool under learning environment control dominates. In the tiling mode, control is shared between the learner tool under user control and the partner tool under learning environment control. The user area 310 and the system area 312 vary in width or disappear according to the selected degree of control.

With reference to the third embodiment described above, objects 1030 correspond to creatures, or animated figures, and operations 1032 correspond to operations performed on the creatures such as create, modify, launch into the activation area, replicate and save. Learner tool 1020 corresponds to user area 810 and the operations performed in user area 810 under user control. Partner tool 1022 corresponds to activation field 812 and the operations performed in activation field 812 under control of the computational system.

The selectable degrees of learner tool control and partner tool control correspond to the different modes which may be selected by the user. In the draw mode and the mingle mode, the learner tool under user control dominates. In the stage mode and the stir mode, the partner tool under learning environment control dominates. In the enact mode, control is shared between the learner tool under user control and the partner tool under learning environment control.

It will be understood that a variety of different embodiments may be implemented in accordance with the above principles. Such embodiments may include modifications of the embodiments described above, as well as entirely new embodiments based on FIG. 23 and the accompanying description.

Having described several embodiments, the present invention is not limited to any specific disclosed embodiments. Those of ordinary skill in the art will readily recognize different modifications and variations which are part of this invention. Overall, the concept is the use of a computer-based system for interactive learning about patterns which are the emergent effects from interrelated dynamics of multi-variate systems. This process of element creation and selection, replication, and modification can be substantiated in various environments.

What is claimed is:

1. A method for learning in a learning environment including a learner tool, a partner tool, objects, and operations, comprising:

selecting a degree of control over the learner tool, the partner tool, the objects, and a subset of the operations, the subset of operations associated with the selected degree of control;

selecting a subset of the objects; and interacting with the learner tool and the partner tool to manipulate the subset of objects with the subset of operations according to the selected degree of control, to enable a constructive dialogue between a user and the learning environment.

2. The method of claim 1 wherein learner operations modify objects under user control.

3. The method of claim 1 wherein learner operations generate objects under user control.

4. The method of claim 3 wherein each object has a plurality of parts.

5. The method of claim 1 wherein partner operations transform the objects under learning environment control.

6. The method of claim 5 wherein objects are stored in a library.

7. The method of claim 1 wherein the selected degree of control over the learner tool and the partner tool is within the range of total learner tool control and total partner tool control.

8. The method of claim 1 wherein the selected degree of control is equal between the learner tool and the partner tool to maximize turn-taking between the learner tool and the user tool while interacting.

9. The method of claim 2 or claim 6 wherein the learner operations include assigning to the objects moving operations, sensing operations, and responding operations, and wherein the partner operations include activating the assigned operations.

10. The method of claim 9 wherein activation of the operations causes the objects to move in place, sense other objects, and respond to the sensed other objects.

11. The method of claim 10 wherein responding to the sensed other objects includes effecting changes of their positions.

12. The method of claim 1 wherein the learner tool includes a learner interface and the partner tool includes a partner interface, and varying the sizes of the learner interface and the partner interface according to the degree of control.

13. The method of claim 1 wherein partner operations are performed automatically under learning environment control.

14. The method of claim 1 wherein partner operations include replicating the objects under learning environment control.

15. The method of claim 1 wherein learner operations include generating objects having specified characteristics under user control and wherein partner operations include causing the generated objects to interact in accordance with the specified characteristics.

16. The method of claim 1 wherein learner operations include combining objects under user control.

17. The method of claim 1 wherein the selected degree of control is shared between the learner tool and the partner tool to promote turn-taking between the learner tool and the partner tool while interacting.

18. The method of claim 1 wherein the objects are tiles.

19. The method of claim 18 wherein the partner operations include replicating selected tiles under learning environment control.

20. The method of claim 18 wherein the learner operations include modifying the tiles under user control.

21. The method of claim 18 wherein the learner operations include creating new tiles under user control.

22. The method of claim 18 wherein the learner operations include transforming tiles under user control.

23. The method of claim 18 wherein the learner operations include combining tiles under user control.

24. The method of claim 18 wherein partner operations include proposing new tiles under learner environment control.

25. The method of claim 18 wherein the learner tool includes a learner interface and the partner tool includes a partner interface, further including varying the sizes of the learner interface and the partner interface according to the selected degree of control.

26. The method claim 1 wherein the learning environment is implemented as a computational system.

27. The method of claim 1 wherein the objects are animated figures.

28. The method of claim 27 wherein learner operations include creating the animated figures having selected behaviors under user control.

29. The method of claim 28 wherein the learner operations include modifying the behaviors of the animated figures.

30. The method of claim 28 wherein the learner operations include launching the animated figures into an activation field and wherein the partner operations include causing interaction between the animated figures in the activation field in accordance with the selected behaviors.

31. The method of claim 30 wherein learner operations include modifying the behaviors of the animated figures in the activation field under user control.

32. The method of claim 30 wherein the partner operations include modifying the behaviors of the animated figures in the activation field under learning environment control.

33. The method of claim 28 wherein learner operations include saving the animated figures in a library under user control.

34. The method of claim 27 wherein the learning environment is implemented as a computational system having a display screen, wherein the learner tool includes a user area and the partner tool includes an activation field, further including varying the sizes of the user area and the activation field according to the selected degree of control.

35. The method of claim 1 wherein the step of selecting a degree of control includes changing from a first selected degree of control to a second selected degree of control.

36. The method of claim 1 wherein the step of selecting a degree of control includes selecting a degree of control which provides shared control between the user and the learning environment.

37. The method of claim 1 wherein the learning environment includes a plurality of selectable learning modes having different degrees of user control and learning environment control.

38. The method of claim 1 wherein the step of interacting with the learner tool and the partner tool comprises constructing a dynamic system including a plurality of objects that interact with each other.

39. The method of claim 38 wherein the step of interacting with the learner tool and the partner tool further comprises the step of transforming the dynamic system.

40. A method for constructive-dialogic learning with a computational system, wherein said computational system executes the steps of:

in response to user selection of predefined object parts having predetermined characteristics, constructing objects having the predetermined characteristics of the selected object parts;

in response to user launching of the constructed objects into an object environment, demonstrating interactions between the constructed objects in accordance with the predetermined characteristics of the selected object parts; and adjusting one or more of the predetermined characteristics of an object in response to user input.

41. A method for constructive-dialogic learning as defined in claim 40 further comprising the step of adjusting one or more of the predetermined characteristics of all objects in the object environment in response to user input.

42. A method for constructive-dialogic learning as defined in claim 40 further comprising the step of adjusting one or more of the predetermined characteristics of all objects in the object environment automatically.

43. A method for constructive-dialogic learning as defined in claim 40 further comprising the step of providing operating modes for selection by the user, said modes having different degrees of user control over the object environment.

44. A method for constructive-dialogic learning as defined in claim 43 wherein the step of providing operating modes comprises providing a mode wherein the user has total control over the object environment.

45. A method for constructive-dialogic learning as defined in claim 43 wherein the step of providing operating modes comprises providing a mode wherein the computational system has total control over the object environment.

46. A method for constructive-dialogic learning as defined in claim 43 wherein the step of providing operating modes comprises providing a mode wherein control over the object environment is shared between the user and the computational system.

47. A method for constructive-dialogic learning as defined in claim 40 wherein said objects are representations of creatures, wherein said object parts are representations of creature parts having predetermined behavioral components and wherein said object environment is a dynamic environment for interaction between constructed creatures having the predetermined behavioral components of the selected creature parts.

48. A method for constructive-dialogic learning as defined in claim 40 further comprising the step of providing a library of object parts having predetermined characteristics for selection by the user.

49. A method for constructive-dialogic learning as defined in claim 40 further comprising the step of saving a constructed object in response to user input.

50. A method for constructive-dialogic learning as defined in claim 40 wherein the step of demonstrating interactions between the constructed objects comprises representing dynamic interactions between the constructed objects on a video display screen of the computational system.

51. Apparatus for constructive-dialogic learning, comprising:
   a computational system including a processor, a memory, and a user interface having a display screen, said computational system further comprising:
   means, responsive to user selection of predefined object parts having predetermined characteristics, for constructing objects having the predetermined characteristics of the selected object parts;
   means, responsive to user launching of the constructed objects into an object environment, for demonstrating interactions between the constructed objects in accordance with the predetermined characteristics of the selected object parts; and
   means for adjusting one or more of the predetermined characteristics of the selected object parts in response to user input.

52. Apparatus for learning comprising:
   a computational system including a processor, a memory and a user interface having a display screen, said computational system further comprising:
   means for implementing a learner tool, a partner tool, objects, and operations;
   means for selecting a degree of control over the learner tool, the partner tool, the objects and a subset of the operations, the subset of operations associated with the selected degree of control;
   means for selecting a subset of the objects; and
   means for interacting with a user utilizing the learner tool and the partner tool to manipulate the subset of objects with the subset of operations according to the selected degree of control, to enable a constructive dialogue between the user and the learning environment.

53. Apparatus as defined in claim 52, wherein said computational system is packaged in a portable housing having a carrying handle, wherein the apparatus may be carried by a person.

54. Apparatus as defined in claim 53, herein said user interface comprises one or more input devices selected from the group consisting of a stylus, a touch screen, a mouse, a trackball, a camera, microphone, and the like.

55. Apparatus as defined in claim 53, wherein said user interface comprises an activity book including a touch-sensitive screen and memory.

* * * * *